United States Patent
Kitajima et al.

(10) Patent No.: US 10,713,142 B2
(45) Date of Patent: Jul. 14, 2020

(54) METHOD AND DEVICE FOR IDENTIFYING BOTTLENECK CANDIDATE

(71) Applicant: FUJITSU LIMITED, Kawasaki-shi, Kanagawa (JP)

(72) Inventors: Shinya Kitajima, Shinagawa (JP); Shinji Kikuchi, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 352 days.

(21) Appl. No.: 15/647,295

(22) Filed: Jul. 12, 2017

(65) Prior Publication Data

US 2018/0024905 A1 Jan. 25, 2018

(30) Foreign Application Priority Data

Jul. 21, 2016 (JP) .................................. 2016-143723

(51) Int. Cl.
*G06F 11/34* (2006.01)
(52) U.S. Cl.
CPC .......... *G06F 11/3423* (2013.01); *G06F 11/34* (2013.01); *G06F 11/3447* (2013.01); *G06F 11/3414* (2013.01)
(58) Field of Classification Search
None
See application file for complete search history.

(56) References Cited

U.S. PATENT DOCUMENTS

| 7,185,192 | B1* | 2/2007 | Kahn ................... G06F 21/6218 |
| | | | 707/999.003 |
| 7,808,504 | B2* | 10/2010 | Bakalash .............. G06F 3/1423 |
| | | | 345/519 |
| 7,836,181 | B2* | 11/2010 | Bejerano ............... H04W 48/20 |
| | | | 709/226 |
| 8,234,395 | B2* | 7/2012 | Millington ............... H03G 3/00 |
| | | | 709/231 |

(Continued)

FOREIGN PATENT DOCUMENTS

JP 2014-38578 2/2014

OTHER PUBLICATIONS

Simon Malkowski in Bottleneck Detection Using Statistical Intervention Analysis, 13 pages, IFIP International Federation for Information Processing 2007 (Year: 2007).*

(Continued)

*Primary Examiner* — Tung S Lau
(74) *Attorney, Agent, or Firm* — Xsensus LLP

(57) ABSTRACT

A method includes, based on communication times regarding an execution command and a response of each of a plurality of services included in a task executed two or more times, and on information on an information processing device that executes each of the plurality of services, generating a group of one or more services executed continuously by a same information processing device in each of the executions of the task, calculating a first processing time of an entirety of the one or more services in each group, calculating a second processing time per service obtained by (Continued)

dividing the first processing time by a number of the one or more services in each group, calculating an average processing time by averaging the second processing times for each of the plurality of services for each task, and outputting a specific service based on the average processing time.

13 Claims, 25 Drawing Sheets

(56) References Cited

U.S. PATENT DOCUMENTS

| | | | | |
|---|---|---|---|---|
| 2002/0091991 A1* | 7/2002 | Castro | ............... | G06F 9/06 717/106 |
| 2003/0093442 A1* | 5/2003 | Mogi | ............... | G06F 16/221 |
| 2004/0193827 A1* | 9/2004 | Mogi | ............... | G06F 9/5083 711/170 |
| 2005/0108444 A1* | 5/2005 | Flauaus | ............... | H04L 41/0853 710/15 |
| 2005/0117045 A1* | 6/2005 | Abdellatif | ............... | H04N 5/2254 348/335 |
| 2010/0022309 A1* | 1/2010 | Yatsuzuka | ............... | A63F 13/12 463/42 |
| 2011/0004885 A1* | 1/2011 | Kikuchi | ............... | H04L 41/147 718/104 |
| 2013/0116976 A1* | 5/2013 | Kanemasa | ............... | G06F 11/3419 702/186 |
| 2014/0007250 A1* | 1/2014 | Stefanov | ............... | G06F 21/60 726/26 |
| 2014/0052841 A1* | 2/2014 | Kanemasa | ............... | G06F 9/5083 709/224 |
| 2014/0201114 A1* | 7/2014 | Tamano | ............... | G06N 20/00 706/12 |
| 2015/0350019 A1* | 12/2015 | Terayama | ............... | H04L 41/0816 709/221 |

OTHER PUBLICATIONS

M.Subramaniyan in Real-Time Data-Driven Average Active Period Method for Bottleneck Detection, 10 pages, 2016 WIT Press (Year: 2016).*

* cited by examiner

FIG. 4

| TASK | SERVICE NAME | | | | | | | |
|---|---|---|---|---|---|---|---|---|
| | 1 | 2 | 3 | 4 | 5 | 6 | 7 | 8 |
| T1 | l | f | j | k | e | f | | |
| T2 | a | k | e | f | g | h | i | j |

FIG. 5

TASK T1

| TASK ID | INFORMATION ID | | | | | |
|---|---|---|---|---|---|---|
| | l | f | j | k | e | f |
| T1-1 | A-l-001 | A-f-001 | A-j-001 | B-k-001 | B-e-001 | B-f-001 |
| T1-2 | C-l-001 | A-f-002 | D-j-001 | D-k-001 | D-e-001 | B-f-002 |
| T1-3 | A-l-002 | B-f-001 | E-j-001 | E-k-001 | C-e-001 | A-f-001 |

TASK T2

| TASK ID | INFORMATION ID | | | | | | | | |
|---|---|---|---|---|---|---|---|---|---|
| | a | k | e | f | g | h | i | j |
| T2-1 | A-a-001 | B-k-001 | B-e-001 | A-f-001 | D-g-001 | A-h-001 | B-i-001 | A-j-001 |
| T2-2 | B-a-001 | E-k-001 | C-e-001 | A-f-002 | E-g-001 | C-h-001 | C-i-001 | E-j-001 |
| T2-3 | C-a-001 | D-k-001 | D-e-001 | B-f-001 | D-g-002 | E-h-001 | B-i-002 | D-j-001 |

FIG. 6

| TASK ID | TRANSMISSION DESTINATION | SERVICE | TRANSMISSION TIME |
|---|---|---|---|
| T1-1 | A | I | 2015/12/22 00:10:05.319 |
| T1-2 | C | I | 2015/12/22 00:10:05.345 |
| T2-1 | A | a | 2015/12/22 00:10:06.245 |
| T2-2 | B | a | 2015/12/22 00:10:13.408 |
| ... | ... | ... | ... |

FIG. 7

| RECEPTION ID | TRANSMISSION DESTINATION | SERVICE | RECEPTION TIME |
|---|---|---|---|
| R1-I1 | GW | l | 2015/12/22 00:10:05.324 |
| R1-I2 | C | f | 2015/12/22 00:10:05.410 |
| R1-I3 | C | f | 2015/12/22 00:10:06.450 |
| R1-I4 | E | RES:f | 2015/12/22 00:10:13.576 |
| R1-I5 | GW | a | 2015/12/22 00:10:13.413 |
| . . . | . . . | . . . | . . . |

FIG. 8

| TRANSMISSION ID | TRANSMISSION DESTINATION | SERVICE | TRANSMISSION TIME |
|---|---|---|---|
| R1-01 | D | j | 2015/12/22 00:10:05.430 |
| R1-02 | B | k | 2015/12/22 00:10:05.484 |
| R1-03 | E | g | 2015/12/22 00:10:06.456 |
| R1-04 | C | RES:e | 2015/12/22 00:10:06.590 |
| R1-05 | D | b | 2015/12/22 00:10:13.463 |
| . . . | . . . | . . . | . . . |

FIG. 9

TASK T1

| TASK ID | PROCESSING SEQUENCE ||||| 
|---|---|---|---|---|---|
| | 1 | 2 | 3 | 4 | 5 |
| T1-1 | l,f,j | k,e,f | | | |
| T1-2 | l | f | j,k,e | f | |
| T1-3 | l | f | j,k | e | f |

TASK T2

| TASK ID | PROCESSING SEQUENCE |||||||
|---|---|---|---|---|---|---|---|
| | 1 | 2 | 3 | 4 | 5 | 6 | 7 |
| T2-1 | a | k,e | f | g | h | i | j |
| T2-2 | a | k,j | e,h,i | f | g | | |
| T2-3 | a | k,e,j | f | g | h | i | |

FIG. 10

TASK T1

| TASK ID | PROCESSING SEQUENCE | | | | |
|---|---|---|---|---|---|
| | 1 | 2 | 3 | 4 | 5 |
| T1-1 | l,f,j | k,e,f | | | |
| T1-2 | - | f | j,k,e,(4) | f | |
| T1-3 | - | f | j,k,(4) | e,(5) | f |

TASK T2

| TASK ID | PROCESSING SEQUENCE | | | | | | |
|---|---|---|---|---|---|---|---|
| | 1 | 2 | 3 | 4 | 5 | 6 | 7 |
| T2-1 | a | k,e,(3),(5) | f,(4) | g | h,(6) | i | j |
| T2-2 | a | k,(3),j | e,(4),h,i | f,(5) | g | | |
| T2-3 | a | k,e,(3),(5),j | f,(4) | g | h,(6) | i | |

FIG. 11

TASK T1

| TASK ID | PROCESSING SEQUENCE | | | | |
|---|---|---|---|---|---|
| | 1 | 2 | 3 | 4 | 5 |
| T1-1 | 160 | 170 | | | |
| T1-2 | 110 | 20 | 200 | 20 | |
| T1-3 | 110 | 20 | 200 | 100 | 20 |

TASK T2

| TASK ID | PROCESSING SEQUENCE | | | | | | |
|---|---|---|---|---|---|---|---|
| | 1 | 2 | 3 | 4 | 5 | 6 | 7 |
| T2-1 | 50 | 880 | 140 | 120 | 590 | 90 | 30 |
| T2-2 | 50 | 910 | 810 | 140 | 120 | | |
| T2-3 | 50 | 910 | 140 | 120 | 590 | 90 | |

FIG. 12

TASK T1

| TASK ID | PROCESSING SEQUENCE | | | | |
|---|---|---|---|---|---|
| | 1 | 2 | 3 | 4 | 5 |
| T1-1 | 160 | 170 | | | |
| T1-2 | 110 | 20 | 180 | 20 | |
| T1-3 | 110 | 20 | 200 | 100 | 20 |

TASK T2

| TASK ID | PROCESSING SEQUENCE | | | | | | |
|---|---|---|---|---|---|---|---|
| | 1 | 2 | 3 | 4 | 5 | 6 | 7 |
| T2-1 | 50 | 150 | 20 | 120 | 500 | 90 | 30 |
| T2-2 | 50 | 100 | 670 | 20 | 120 | | |
| T2-3 | 50 | 180 | 20 | 120 | 500 | 90 | |

FIG. 13

TASK T1

| TASK ID | PROCESSING SEQUENCE | | | | | |
|---|---|---|---|---|---|---|
| | l | f | j | k | e | f |
| T1-1 | 53.33 | 53.33 | 53.33 | 56.67 | 56.67 | 56.67 |
| T1-2 | 110.00 | 20.00 | 60.00 | 60.00 | 60.00 | 20.00 |
| T1-3 | 110.00 | 20.00 | 50.00 | 50.00 | 80.00 | 20.00 |

TASK T2

| TASK ID | PROCESSING SEQUENCE | | | | | | | |
|---|---|---|---|---|---|---|---|---|
| | a | k | e | f | g | h | i | j |
| T2-1 | 50.00 | 75.00 | 75.00 | 20.00 | 120.0 | 500.0 | 90.00 | 30.00 |
| T2-2 | 50.00 | 50.00 | 223.3 | 20.00 | 120.0 | 223.3 | 223.3 | 50.00 |
| T2-3 | 50.00 | 60.00 | 60.00 | 20.00 | 120.0 | 500.0 | 90.00 | 60.00 |

FIG. 14

| a | e | f | g | h | i | j | k | l |
|---|---|---|---|---|---|---|---|---|
| 50.00 | 92.50 | 27.77 | 120.0 | 407.77 | 134.44 | 50.55 | 58.61 | 91.11 |

FIG. 15

The service as a bottleneck candidate is as shown below.
The processing time below is an average processing time for the service estimated by the system.

Service Name    average processing time (estimated value)

Service h    407.77 ms

METHOD AND DEVICE FOR IDENTIFYING BOTTLENECK CANDIDATE

CROSS-REFERENCE TO RELATED APPLICATION

This application is based upon and claims the benefit of priority of the prior Japanese Patent Application No. 2016-143723, filed on Jul. 21, 2016, the entire contents of which are incorporated herein by reference.

FIELD

The embodiments discussed herein are related to a technique for evaluating execution of a service.

BACKGROUND

There is known a conventional technique of: calculating processing times of services by receiving request messages for ordering execution of the services and response messages indicating responses to the respective request messages; and changing the number of concurrent processes for services such that the processing time of each service can fall within a predetermined time range (see, for instance, Japanese Laid-open Patent Publication No. 2014-38578).

SUMMARY

According to an aspect of the invention, a method includes, based on communication times regarding an execution command and a response of each of a plurality of services included in a task executed two or more times, and on information on an information processing device that executes each of the plurality of services, generating a group of one or more services executed continuously by a same information processing device in each of the executions of the task, calculating a first processing time of an entirety of the one or more services in each group, calculating a second processing time per service obtained by dividing the first processing time by a number of the one or more services in each group, calculating an average processing time by averaging the second processing times for each of the plurality of services for each task, and outputting a specific service, as a bottleneck candidate, from among the plurality of services based on the average processing time for each of the plurality of services for each task.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example piece of data stored in a service execution sequence DB;

FIG. 5 is a diagram illustrating an example piece of data stored in a task information DB;

FIG. 6 is a diagram illustrating an example piece of data stored in a gateway transmission-side time DB;

FIG. 7 is a diagram illustrating an example piece of data stored in a reception-side time DB;

FIG. 8 is a diagram illustrating an example piece of data stored in a transmission-side time DB;

FIG. 9 is a diagram illustrating an example piece of data stored in a service group information DB;

FIG. 10 is a diagram illustrating an example piece of data stored in a service group information DB including a service that waits for a response;

FIG. 11 is a diagram illustrating an example piece of data stored in a processing time DB;

FIG. 12 is a diagram illustrating an example piece of data stored in a processing time DB excluding a response wait time;

FIG. 13 is a diagram illustrating an example piece of data stored in a service processing time DB;

FIG. 14 is a diagram illustrating an example piece of data stored in an average processing time DB;

FIG. 15 is an explanatory diagram illustrating a display example in which an average processing time and a service are displayed;

DESCRIPTION OF EMBODIMENTS

The technique disclosed in Japanese Laid-open Patent Publication No. 2014-38578 has a problem in that it is difficult to directly search for a bottleneck candidate.

In an aspect, the technique disclosed in the embodiments aims at easily identifying a bottleneck candidate that may act as an obstacle to execution of services.

First Embodiment

Figure 1:
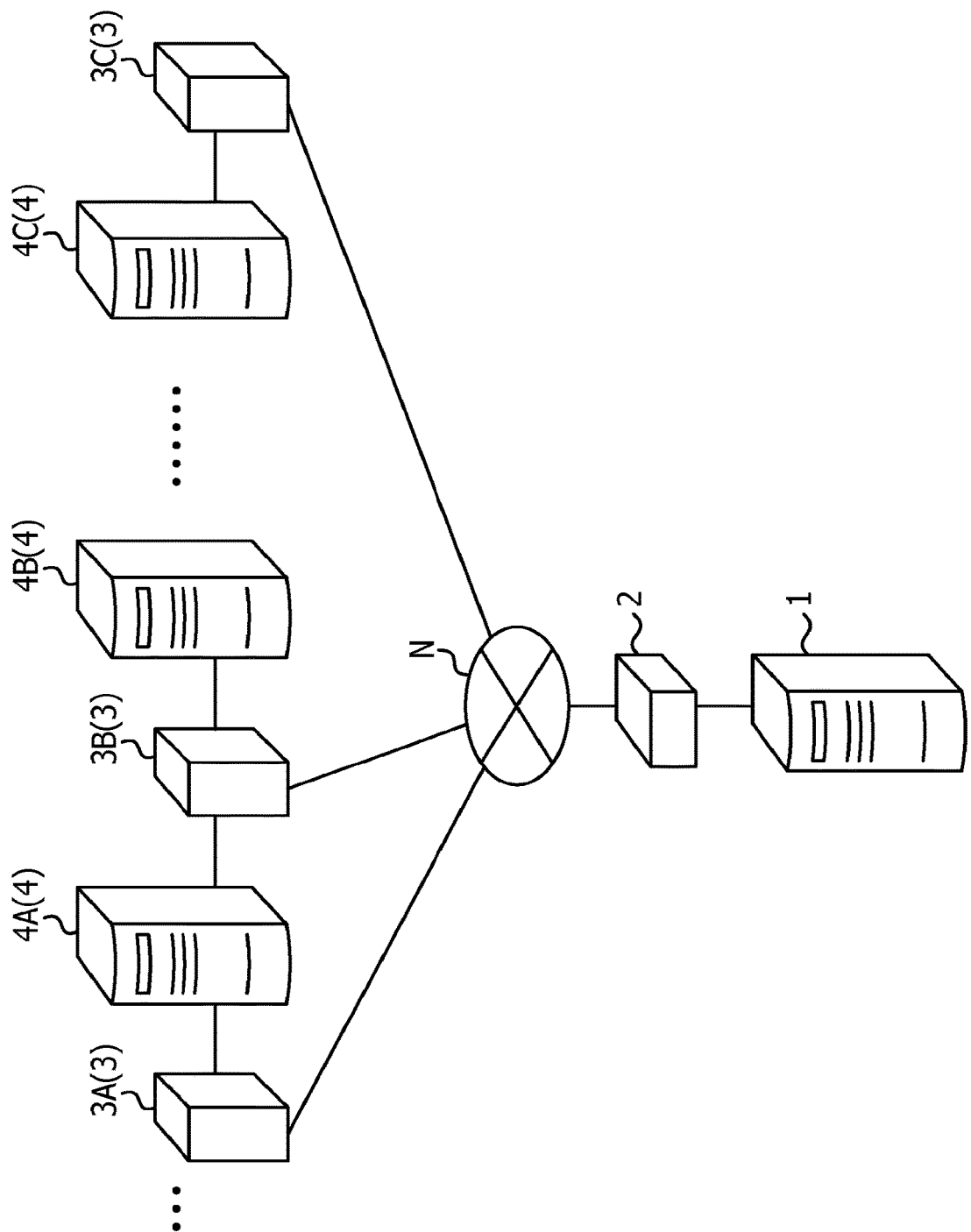
FIG. 1 is a schematic diagram illustrating the outline of an information processing system.

Hereinafter, a first embodiment will be described with reference to the drawings. FIG. 1 is a schematic diagram illustrating the outline of an information processing system. The information processing system illustrated in FIG. 1 includes a computer (hereinafter referred to as an information processing device) 1, a relay device (hereinafter referred to as a gateway) 2, relay devices 3A, 3B, 3C, . . . (hereinafter, representatively referred to as a network equipment 3 in some cases), and information processing devices 4A, 4B, 4C, . . . (hereinafter, representatively referred to as an information processing device 4). The information processing device 1 and the network equipment 3 are coupled to each other via the gateway 2 and a communication network N such as the Internet, a local area network (LAN) or a mobile phone network. In addition, the network equipment 3 and the information processing device 4 are coupled to each other.

Hereinafter the outline of the information processing system will be described. The information processing device 1 is, for instance, a personal computer or a server computer. The information processing device 1 is a device for transmitting a task execution command to execute multiple services included in a task to the information processing device 4 via the gateway 2 and the network equipment 3. Examples of the services are a user information management service and an inventory information management service. There are multiple tasks and the information processing device 1 transmits a task execution command to execute a task multiple times to the information processing device 4. The task is, for instance, accounting processing.

The gateway 2 and the network equipment 3 are, for instance, routers. The gateway 2 is a device that performs conversion of data with different protocols, and that relays information between the information processing device 1 and the network equipment 3. The network equipment 3 is a device that relays information between the gateway 2 and the information processing devices 4A, 4B, . . . .

The information processing device 4 is, for instance, a server computer or a virtual machine. A container platform that controls containers such as multiple applications or middleware is mounted in the information processing device 4. When the information processing device 4 receives an instruction command to execute a service from the network equipment 3, the container platform on the information processing device 4 assigns the service to a container. The information processing device 4 executes the service for the assigned container. When execution of the service is completed, the information processing device 4 transmits a response command, which indicates a response to the command, to the network equipment 3.

The network equipment 3 relays a response command which indicates an instruction command or a response to an instruction command. The network equipment 3 stores an instruction command or a response command, and a communication time. The communication time is, for instance, a transmission time at which an instruction command or a response command is transmitted, or a reception time at which an instruction command or a response command is received. The instruction command and the response command are, for instance, the later-described reception ID or transmission ID, the name of the information processing device 4 or gateway 2 that receives or transmits an instruction command or a response command, and the name of a service. The network equipment 3 transmits a stored communication time to the information processing device 1. The information processing device 1 receives the communication time from the network equipment 3.

The information processing device 1 calculates a processing time during which processing is executed by the information processing device 4. The information processing device 1 calculates a service processing time during which each service is executed, based on the calculated processing time. For each task, the information processing device 1 calculates an average processing time that indicates an average of the service processing time. The information processing device 1 extracts the longest average processing time and a service corresponding to the longest average processing time, from the service processing time. The information processing device 1 outputs the extracted longest average processing time and service to the later-described display unit 15. This allows an administrator of the information processing device 1 to identify a bottleneck candidate which may act as an obstacle to the processing.

Figure 2:
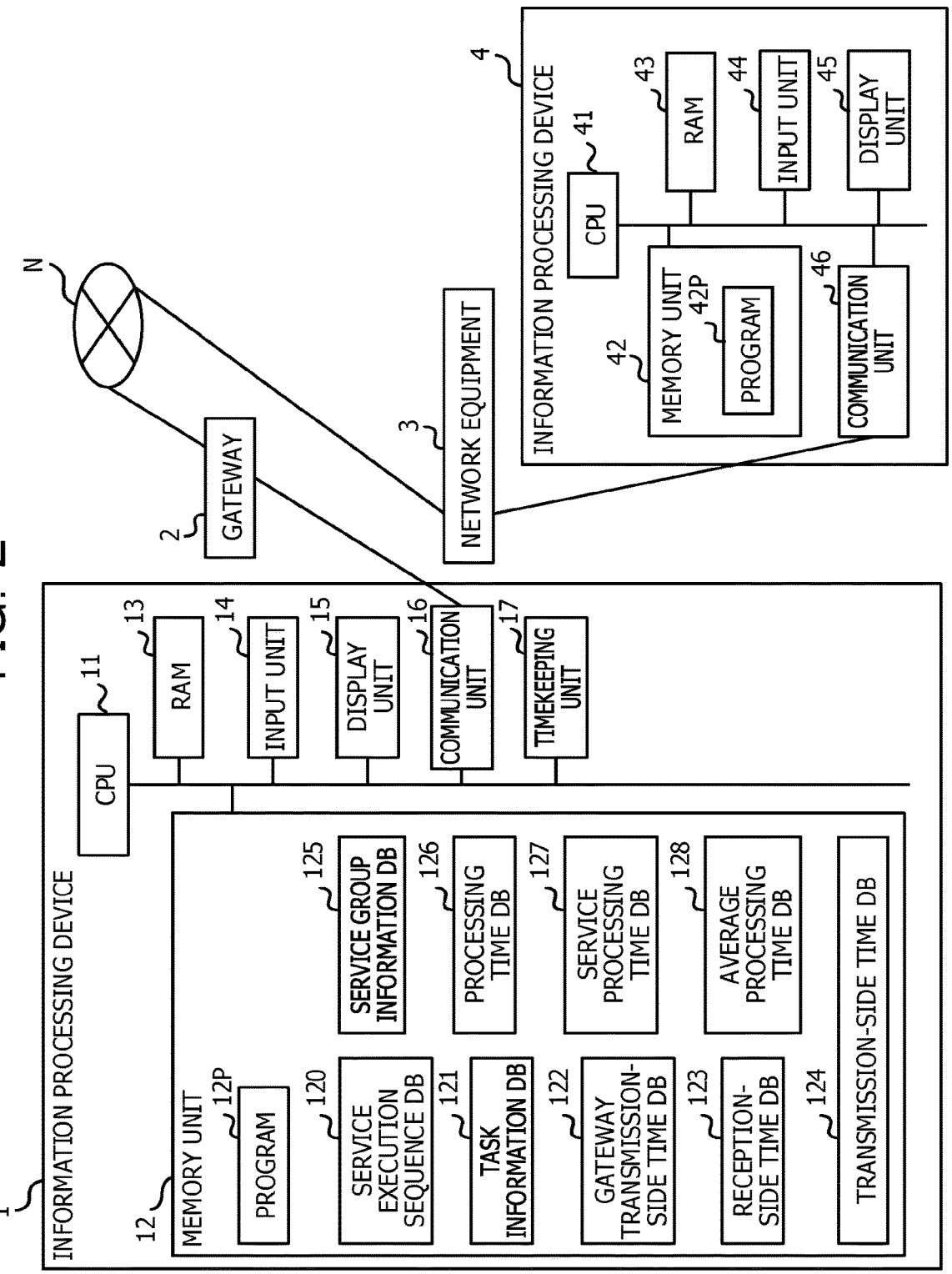
FIG. 2 is a block diagram illustrating the hardware groups of an information processing device and another information processing device.

Hereinafter, the details of the information processing system will be described. FIG. 2 is a block diagram illustrating the hardware groups of the information processing device 1 and the information processing device 4. The information processing device 1 illustrated in FIG. 2 includes a central processing unit (CPU) 11, a memory unit 12, a RAM 13, an input unit 14, a display unit 15, a communication unit 16, and a timekeeping unit 17.

The CPU 11 is coupled to each unit of the hardware group via a bus. The CPU 11 includes one or multiple CPUs or a multi-core CPU. The CPU 11 controls each unit of the hardware group in accordance with a program 12P stored in the memory unit 12.

The memory unit 12 is, for instance, a hard disk or a large-capacity memory. The memory unit 12 stores various pieces of data requested when the CPU 11 performs processing, a service execution sequence DB 120, a task information DB 121, a gateway transmission-side time DB 122, a reception-side time DB 123, a transmission-side time DB 124, a service group information DB 125, a processing time DB 126, a service processing time DB 127, an average processing time DB 128, and the program 12P.

The RAM 13 is, for instance, a static random access memory (SRAM), a dynamic random access memory (DRAM), or a flash memory. The RAM 13 also serves as a memory unit, and temporarily stores various pieces of data that are generated when various programs are executed by the CPU 11.

The input unit 14 is an input device such as a button, and transmits received operation information to the CPU 11. The display unit 15 displays image data transmitted from the CPU 11. The display unit 15 is, for instance, a liquid crystal display. The communication unit 16 is, for instance, a wireless LAN card or a communication module for mobile phones, and transmits and receives various pieces of information to and from the gateway 2 via the communication network N. The timekeeping unit 17 keeps, for instance, the time at the present point, and outputs a result of timekeeping to the CPU 11 in accordance with the request of the CPU 11.

The information processing device 4 illustrated in FIG. 2 includes a CPU 41, a memory unit 42, a RAM 43, an input unit 44, a display unit 45, and a communication unit 46. The configuration of the CPU 41, the memory unit 42, the RAM 43, the input unit 44, and the display unit 45 of the information processing device 4 is the same as the configuration of the CPU 11, the memory unit 12, the RAM 13, the input unit 14, and the display unit 15 of the information processing device 1, and thus a description is omitted for the sake of simplicity. The communication unit 46 is, for instance, a wireless LAN card or a communication module for mobile phones, and transmits and receives various pieces of information to and from the network equipment 3 via the communication network N.

Figure 3:
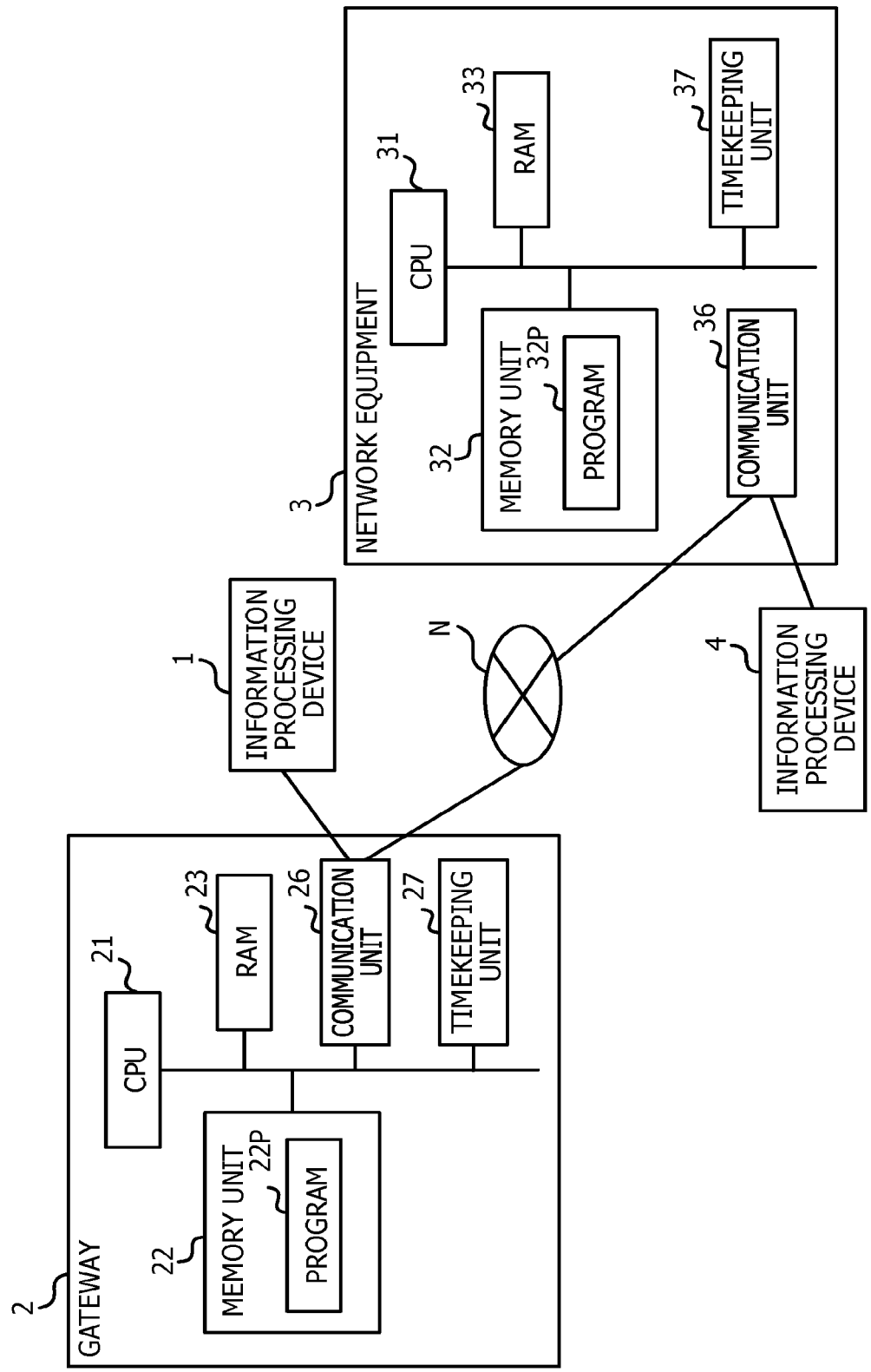
FIG. 3 is a block diagram illustrating the hardware groups of a gateway and a network equipment.

FIG. 3 is a block diagram illustrating the hardware groups of the gateway 2 and the network equipment 3. The gateway 2 illustrated in FIG. 3 includes a CPU 21, a memory unit 22, a RAM 23, a communication unit 26, and a timekeeping unit 27. The configuration of the CPU 21, the memory unit 22, the RAM 23, and the timekeeping unit 27 of the gateway 2 is the same as the configuration of the CPU 11, the memory unit 12, the RAM 13, and the timekeeping unit 17 of the information processing device 1, and thus a description is omitted for the sake of simplicity. The communication unit 26 is, for instance, a wireless LAN card or a communication module for mobile phones, and transmits and receives various pieces of information to and from the information processing device 1 and the network equipment 3 via the communication network N.

The network equipment 3 illustrated in FIG. 3 includes a CPU 31, a memory unit 32, a RAM 33, a communication unit 36, and a time timekeeping unit 37. The configuration of the CPU 31, the memory unit 32, the RAM 33, and the timekeeping unit 37 of the network equipment 3 is the same as the configuration of the CPU 11, the memory unit 12, the RAM 13, and the timekeeping unit 17 of the information processing device 1, and thus a description is omitted for the sake of simplicity. The communication unit 36 is, for instance, a wireless LAN card or a communication module for mobile phones, and transmits and receives various pieces of information to and from the gateway 2 and the information processing device 4 via the communication network N.

FIG. 4 is a diagram illustrating an example piece of data stored in the service execution sequence DB 120. The service execution sequence DB 120 is a database that stores an execution sequence of the services included in each task. The task is a command that causes, for instance, multiple services to be executed. The service execution sequence DB 120 includes a task column and a service name column. The task column stores tasks that each serve as a primary key. The service name column includes 1st, 2nd, 3rd, . . . columns. The service name column stores the names of services, and 1, 2, 3, . . . indicate an execution sequence of services. The CPU 11 receives input of services corresponding to a task and an execution sequence of the services in advance via the input unit 14 from the administrator, and stores the received services and the execution sequence of the services in the service execution sequence DB 120. For instance, the 2nd column of the service name column of a task "T1" stores a service "f". In other words, this indicates that the service "f" is executed as the second service of the task "T1". Also, the 1st column of the service name column of a task "T2" stores a service "a". In other words, this indicates that the service "a" is executed as the first service of the task "T2".

FIG. 5 is a diagram illustrating an example piece of data stored in the task information DB 121. The task information DB 121 is a database that stores correspondence relationships between a task ID for identifying a task, and information ID for identifying an information processing device 4 corresponding to the task ID. Even when the same type of task is executed, one or more of services may be assigned to a different information processing device 4 each time of executing the task. For this reason, for each task ID, the task information DB 121 stores a table indicating a correspondence relationship between the task ID and the information ID of the information processing device 4 that executes the relevant services. Each table includes a task ID column and an information ID column. The task ID column stores task IDs that each serve as a primary key. The task ID column stores, for instance, "T1-1". "T1-1" indicates a task T1 that is executed for the first time, for instance. The information ID column further includes l, f, j, . . . columns. The l, f, j, . . . columns are names of services, and the CPU 11 refers to the service execution sequence DB 120 and stores a service name column corresponding to a task in each information ID column.

The l, f, j, . . . columns store an information ID corresponding to each service name. The f column of "T1-1" row stores, for instance, "A-f-001". "A-f-001" indicates the first ID that represents an information processing device "A" that executes the service "f", for instance.

The storage method for the task information DB 121 is as follows. From each information processing device 4, the CPU 11 receives a task ID and an information ID of a task executed by the information processing device 4. The CPU 11 stores the received task ID and information ID in the task information DB 121. It is to be noted that the first embodiment is based on the assumption that a task is executed three times for the sake of convenience of the description. However, the first embodiment is not limited to this. For instance, a task may be executed repeatedly until a predetermined time elapses, and the task ID of the executed task and the information ID of the information processing device 4 that executed the task may be stored in the task information DB 121. Alternatively, the CPU 11 may execute a task repeatedly until the number of executions of a service exceeds a predetermined number, and the task ID of the executed task and the information ID of the information processing device 4 that executed the task may be stored in the task information DB 121.

FIG. 6 is a diagram illustrating an example piece of data stored in the gateway transmission-side time DB 122. The gateway transmission-side time DB 122 is a database that stores a transmission time at which a task execution command to execute multiple services included in a task was transmitted. The gateway transmission-side time DB 122 includes a task ID column, a transmission destination column, a service column and a transmission time column. The task ID column stores task IDs that each serve as a primary key. The transmission destination column stores the name of each information processing device 4 that transmits a task execution command via the network equipment 3. The service column stores the name of a service that is first executed by the information processing device 4. The transmission time column stores a transmission time at which a task execution command was transmitted. The transmission time column stores, for instance, "2015 Dec. 22 00:10:05.319". "2015 Dec. 22 00:10:05.319" indicates 0 hr 10 min 5.319 sec, Dec. 22, 2015.

The gateway 2, each time transmitting an instruction command, stores a task ID, a transmission destination information processing device, a service and a transmission time in the memory unit 22. The gateway 2 transmits a task ID, a transmission destination information processing device, a service and a transmission time from the communication unit 26 to the information processing device 1 with any time interval. The information processing device 1 receives the task ID, the transmission destination information processing device, the service and the transmission time from the gateway 2, and stores the received task ID, transmission destination information processing device, service and transmission time in the gateway transmission-side time DB 122.

FIG. 7 is a diagram illustrating an example piece of data stored in the reception-side time DB 123. The reception-side time DB 123 is a database that stores a reception time at which an instruction command to execute a service or a response to an instruction command was received. The reception-side time DB 123 includes a reception ID column, a transmission source column, a service column and a reception time column. The reception ID column stores a reception ID for identifying a reception time. The transmission source column stores the name of the information processing device 4 or the gateway 2 that received an instruction command or a response command. The service column stores the name of a service executed by the information processing device 4 and response information indicating whether or not a service waiting for a response is present. The response information is, for instance, "RES:". Also, "GW" in the transmission source column indicates the gateway 2, for instance. "C" or "E" in the transmission source column indicates, for instance, information processing device 4C or 4E.

The network equipment 3, each time receiving an instruction command or a response command, stores a reception ID, a transmission source information processing device, a service and a reception time in the memory unit 22. The network equipment 3 transmits a reception ID, a transmission source information processing device, a service, response information and a reception time from the communication unit 26 to the information processing device 1 with any time interval. The information processing device 1 receives a reception ID, a transmission source information processing device, a service, response information and a reception time from the network equipment 3 by the communication unit 16, and stores the received reception ID, transmission source information processing device, service, response information and reception time in the reception-side time DB 123.

FIG. 8 is a diagram illustrating an example piece of data stored in the transmission-side time DB 124. The transmission-side time DB 124 is a database that stores a transmission time at which an instruction command to execute a service or a response to an instruction command was transmitted. The transmission-side time DB 124 includes a transmission ID column, a transmission destination column, a service column and a transmission time column. The transmission ID column stores a transmission ID for identifying a transmission time. The transmission destination column stores the name of the information processing device 4 or the gateway 2 that transmitted an instruction command or a response command. The service column stores the name of a service executed by the information processing device 4, and response information.

The network equipment 3, each time transmitting an instruction command or a response command, stores a transmission ID, a transmission destination information processing device, a service and a transmission time in the memory unit 22. The network equipment 3 transmits a transmission ID, a transmission destination information processing device, a service and a transmission time from the communication unit 26 to the information processing device 1 with any time interval. The information processing device 1 receives a transmission ID, a transmission destination information processing device, a service, response information and a transmission time from the network equipment 3, and stores the received transmission ID, transmission destination information processing device, service, response information and transmission time in the transmission-side time DB 124.

FIG. 9 is a diagram illustrating an example piece of data stored in the service group information DB 125. The service group information DB 125 is a database that stores a correspondence relationship between a task and a group obtained by grouping services continuously executed by the same information processing device 4. The service group information DB 125 includes a task ID column and a processing sequence column. The task ID column stores task IDs that each serve as a primary key. The processing sequence column further includes a 1st column, a 2nd column, a 3rd column etc. The name of each column in the processing sequence column indicates a processing sequence of services, and each column stores a group. The group is classification obtained by grouping one or multiple services continuously executed by, for instance, the information processing device 4. For instance, the 1st column of a task "T1-1" stores the services "l, f, j" that are continuously executed by the information processing device "A". The 2nd column of the task "T1-1" stores the services "k, e, f" that are continuously executed by the information processing device "B". The 2nd column of a task "T1-2" stores the service "f" that is executed by the information processing device "A". The storage method for the service group information DB 125 will be described later.

FIG. 10 is a diagram illustrating an example piece of data stored in the service group information DB 125 including a service that waits for a response. For instance, the 3rd column of the processing sequence column of the task "T1-2" stores "j, k, e, (4)". For instance, "j, k, e, (4)" indicates that the service e waits for a response from (4), that is, the service f stored in the 4th column of the processing sequence column. The 3rd column of the processing sequence column of a task "T1-3" stores "j, k, (4)". For instance, "j, k, (4)" indicates that the service k waits for a response from (4), that is, the service e and (5) stored in the 4th column of the processing sequence column. The 4th column of the processing sequence column of the task "T1-3" stores "e, (5)". For instance, "e, (5)" indicates that the service e waits for a response from (5), that is, the service f stored in the 5th column of the processing sequence column. The storage method for the service group information DB 125 including a service that waits for a response will be described later.

FIG. 11 is a diagram illustrating an example piece of data stored in the processing time DB 126. The processing time DB 126 is a database that stores the total processing time of executed multiple services per group. The unit of processing time is millisecond. Each of the columns of the processing time DB 126 is the same as a corresponding one of the columns of the service group information DB 125, and thus a description is omitted. Also, each of the columns of the processing time DB 126 corresponds to one of the columns of the service group information DB 125. For instance, the 1st column of the task "T1-1" indicates the processing time of the group of services "l, f, j" is 160 ms. The storage method for the processing time DB 126 will be described later.

FIG. 12 is a diagram illustrating an example piece of data stored in the processing time DB 126 excluding a response wait time. For instance, the 4th column of a task "T2-2" stores 20 ms. This is the value obtained by subtracting the processing time of 120 ms in the 5th column of the task ID "T2-2" waiting for a response from the processing time of 140 ms in the 4th column of the task ID "T2-2" illustrated in FIG. 11. The storage method for the processing time DB 126 excluding a response wait time will be described later.

FIG. 13 is a diagram illustrating an example piece of data stored in the service processing time DB 127. The service processing time DB 127 is a database that indicates a service processing time that represents a processing time per service. The service processing time DB 127 includes a task ID column and a service column. The task ID column stores task IDs that each serve as a primary key. The service column further includes l, f, j, . . . columns that are services included in a task ID. A service processing time is stored in l, f, j, . . . columns. For instance, the f column of the task "T1-1" stores "53.33". This indicates that the service processing time of the service f of the task "T1-1" is 53.33 ms. The storage method for the service processing time DB 127 will be described later.

FIG. 14 is a diagram illustrating an example piece of data stored in the average processing time DB 128. The average processing time DB 128 is a database that stores an average processing time which is obtained by averaging the service processing times of each task. The average processing time DB 128 includes the services a, e, f, . . . columns. The services a, e, f columns store average processing times for the services a, e, or f. For instance, the service a column stores "50.00". This indicates that the average processing time of the service a is 50.00 ms. The storage method for the average processing time DB 128 will be described later.

Hereinafter, the storage method for the service group information DB 125 illustrated in FIG. 9 will be described. The CPU 11 reads the service execution sequence DB 120, the task information DB 121, the gateway transmission-side time DB 122, the reception-side time DB 123, and the transmission-side time DB 124 from the memory unit 12. The CPU 11 extracts the task ID "T1-1" from the task information DB 121 illustrated in FIG. 5. The CPU 11 extracts the service "l" corresponding to the extracted task ID "T1-1", from the task information DB 121.

The information ID of the service "l" column of the task ID "T1-1" in the task information DB 121 is present as "A-l-001", and thus the CPU 11 extracts the information processing device "A" that executes the service "l". The CPU 11 extracts the service "f" in the next column of the extracted service "l". Since the information ID of the service "l" column of the task ID "T1-1" is present as "A-f-001", the CPU 11 extracts the information processing device "A" that executes the extracted service "f". The CPU 11 determines whether or not the information processing devices 4 of the extracted service "l" and service "f" are the same.

Since the information processing devices 4 of the service "l" and the service "f" are "A", the CPU 11 determines that the information processing devices 4 are the same. The CPU 11 groups the extracted service "l" and service "f". Subsequently, the CPU 11 extracts the service "j" in the next column of the extracted service "f". Since the information ID of the service "f" column of the task ID "T1-1" is present as "A-j-001", the CPU 11 extracts the information processing device "A" that executes the extracted service "j". The CPU 11 determines whether or not the information processing devices 4 of the extracted service "f" and service "j" are the same. The CPU 11 groups the extracted services "l", "f" and "j". As illustrated in FIG. 9, the CPU 11 stores the grouped services "l, f, j" in the 1st column of the "T1-1" row of the service group information DB 125.

Since the information ID of the service "k" column of the task ID "T1-1" in the task information DB 121 is present as "B-k-001", the CPU 11 extracts the information processing device "B" that executes the service "k". The CPU 11 determines whether or not the information processing devices 4 of the extracted service "j" and service "k" are the same. The CPU 11 determines that the information processing devices 4 of the extracted service "j" and service "k" are not the same, and does not store the service "k" in the 1st column of the "T1-1" row.

The CPU 11 extracts the service "e" in the next column of the extracted service "k". Since the information ID of the service "e" column of the task ID "T1-1" is present as "B-e-001", the CPU 11 extracts the information processing device "B" that executes the service "e". The CPU 11 determines whether or not the information processing devices 4 of the extracted service "k" and service "e" are the same.

Since the information processing devices 4 of the service "k" and the service "e" are "B", the CPU 11 determines that the information processing devices 4 are the same. The CPU 11 groups the extracted service "k" and service "e". Subsequently, the CPU 11 extracts the service "f" in the next column of the extracted service "e". Since the information ID of the last service "f" column of the task ID "T1-1" is present as "B-f-001", the CPU 11 extracts the information processing device "B" that executes the service "f". The CPU 11 determines whether or not the information processing devices 4 of the extracted service "e" and service "f" are the same. The CPU 11 groups the extracted services "k", "e" and "f". The CPU 11 performs the same processing on all the task IDs of the task information DB 121.

Hereinafter, the storage method for the service group information DB 125 including a service that waits for a response in FIG. 10 will be described. The CPU 11 extracts the task ID "T1-1" from the task information DB 121. The CPU 11 extracts the service "l" corresponding to the extracted task ID "T1-1", from the task information DB 121. The CPU 11 refers to the gateway transmission-side time DB 122 and the reception-side time DB 123. The CPU 11 identifies the earliest time in the reception-side time DB 123 at or after the transmission time "2015 Dec. 22 00:10:05.319" of the task ID "T1-1" of the gateway transmission-side time DB 122 illustrated in FIG. 6. Specifically, the CPU 11 identifies the reception time "2015 Dec. 22 00:10:05.324" on the 1st row of the reception-side time DB 123 illustrated in FIG. 7. The CPU 11 determines that the service "l" does not wait for a response because "RES" is not included in the service corresponding to the reception time "2015 Dec. 22 00:10:05.324". The CPU 11 leaves the 1st column of the task ID "T1-1" of the service group information DB 125 as it is. The CPU 11 extracts all the services corresponding to the task ID "T1-1" in the task information DB 121, and determines whether or not a service waiting for a response is present.

The CPU 11 extracts the task ID "T2-2" from the task information DB 121. The CPU 11 extracts the service "f" of the 4th column corresponding to the extracted task ID "T2-2", from the task information DB 121. The CPU 11 refers to the gateway transmission-side time DB 122 and the reception-side time DB 123. The CPU 11 identifies the earliest transmission time corresponding to the service "f" at or after the transmission time "2015 Dec. 22 00:10:13.408" of the task ID "T2-2" of the gateway transmission-side time DB 122 illustrated in FIG. 6. Specifically, the CPU 11 identifies the reception time "2015 Dec. 22 00:10:13.576" on the 4th row of the reception-side time DB 123 illustrated in FIG. 7. The CPU 11 determines that the service "l" waits for a response because "RES" is included in the service corresponding to the reception time "2015 Dec. 22 00:10:13.576".

The CPU 11 refers to the service group information DB 125. The CPU 11 determines that the service "f" and the service "g" belong to different groups because the service "f" is in the 4th column, and the service "g" subsequent to the service "f" is in the 5th column. The CPU 11 stores (5) next to the service "f" in the 4th column of the task ID "T2-2" of the service group information DB 125. The CPU 11 performs the same processing on all the task IDs of the task information DB 121.

Hereinafter, the storage method for the processing time DB 126 illustrated in FIG. 11 will be described. First, a method of calculating a processing time not including waiting for a response will be described. The CPU 11 extracts the task ID "T1-1" from the service group information DB 125. The CPU 11 extracts the 1st column corresponding to the extracted task ID "T1-1", from the service group information DB 125.

The CPU 11 refers to the service group information DB 125 illustrated in FIG. 10, and identifies the first service "l" in the extracted 1st grouped column. The CPU 11 refers to the gateway transmission-side time DB 122 and the reception-side time DB 123. The CPU 11 identifies the earliest time in the reception-side time DB 123 at or after the transmission time "2015 Dec. 22 00:10:05.319". Specifically, the CPU 11 identifies the reception time "2015 Dec. 22 00:10:05.324" on the 1st row of the reception-side time DB 123. The CPU 11 extracts the transmission time "2015 Dec. 22 00:10:05.324" at which the service "l" was transmitted.

The CPU 11 identifies the service subsequent to the group including waiting for a response. Specifically, the CPU 11 identifies the first service "k" in the extracted 2nd grouped column. The CPU 11 refers to the transmission-side time DB 124, and extracts the transmission time "2015 Dec. 22 00:10:05.484" at which the service "k" was transmitted.

The CPU 11 subtracts the reception time "2015 Dec. 22 00:10:05.324" from the transmission time "2015 Dec. 22 00:10:05.484" to calculate a processing time "160 ms". The CPU 11 stores the calculated processing time "160 ms" in the 1st column of the "T1-1" row of the processing time DB 126. The CPU 11 extracts all the groups corresponding to the task ID "T1-1" in the service group information DB 125, calculates a processing time, and stores the calculated processing time in the processing time DB 126.

Next, a method of calculating a processing time including waiting for a response will be described. The CPU 11 extracts the task ID "T2-2" from the service group information DB 125 illustrated in FIG. 10. The CPU 11 extracts the 3rd column corresponding to the extracted task ID "T2-2", from the service group information DB 125.

The CPU 11 identifies the service subsequent to the service that waits for a response. Specifically, the CPU 11 identifies the first service "f" in the 4th column because (4) is present subsequent to the first service "e" in the extracted 3rd column. The CPU 11 extracts the reception time at which an instruction command for the service "f" was received. Specifically, the CPU 11 extracts the reception time "2015 Dec. 22 00:10:06.450" at which an instruction command for the service "f" in the 3rd row of the reception-side time DB 123 was received.

Next, the CPU 11 identifies the service that waits for a response. Specifically, the CPU 11 identifies the service "e" before (4). The CPU 11 extracts the transmission time at which a response command was transmitted to "RES: e". Specifically, the CPU 11 extracts the transmission time "2015 Dec. 22 00:10:06.590" at which a response command was transmitted to the service "RES: e" on the 4th row of the transmission-side time DB 124.

The CPU 11 subtracts the reception time "2015 Dec. 22 00:10:06.450" from the transmission time "2015 Dec. 22 00:10:06.590" to calculate a processing time "140 ms". The CPU 11 stores the calculated processing time "140 ms" in the 4th column of the "T2-2" row of the processing time DB 126. The CPU 11 extracts all the groups corresponding to the task ID "T2-2" in the service group information DB 125, calculates a processing time, and stores the calculated processing time in the processing time DB 126. The CPU 11 performs the same processing on all the task IDs of the service group information DB 125.

The storage method for the processing time DB 126 excluding a response wait time illustrated in FIG. 12 will be described. For instance, the CPU 11 extracts the task ID "T2-2" from the service group information DB 125. The CPU 11 extracts the 4th column corresponding to the extracted task ID "T2-2", from the service group information DB 125.

The CPU 11 refers to the service group information DB 125, and determines whether or not the extracted 4th column includes a service that waits for a response. The CPU 11 determines that the extracted 4th column includes a service that waits for a response. The CPU 11 refers to the processing time DB 126, and subtracts the processing time "120 ms" for waiting for a response in the 5th grouped column from the processing time "140 ms" in the extracted 4th column.

The CPU 11 stores the processing time "20 ms" obtained by the subtraction in the 4th column of the processing time DB 126. The CPU 11 determines whether or not all the groups involved in the task ID "T2-2" in the service group information DB 125 are extracted. The CPU 11 performs the same processing on all the task IDs of the service group information DB 125.

Hereinafter, the storage method for the service processing time DB 127 illustrated in FIG. 13 will be described. The CPU 11 extracts the task ID "T1-1" from the processing time DB 126. The CPU 11 extracts the 1st column corresponding to the extracted task ID "T1-1", from the processing time DB 126.

The CPU 11 refers to the service group information DB 125 and the processing time DB 126. The CPU 11 calculates service a processing time "53.3 ms" by dividing the processing time "160 ms" in the 1st column of the "T1-1" of the processing time DB 126 by the number 3 of the services "l, j, k" included in the 1st column of the "T1-1" of the service group information DB 125. The CPU 11 assigns the calculated service processing time "53.3 ms" to each of the services "l, j, k". The CPU 11 stores the calculated service processing time "53.3 ms" in each of the columns of the services "l, j, k" in the service processing time DB 127.

The CPU 11 performs the same processing on all the groups of the task ID "T1-1" in the service group information DB 125. The CPU 11 performs the same processing on all the task IDs of the service group information DB 125.

Hereinafter, the storage method for the average processing time DB 128 illustrated in FIG. 14 will be described. The CPU 11 extracts service "a" from the service processing time DB 127. The CPU 11 calculates an average processing time "50.00" that indicates the average of the service processing times "50.00", "50.00", and "50.00" of the tasks "T2-1", "T2-2", and "T2-3" corresponding to the extracted service "a". The CPU 11 stores the calculated average processing time "50.00" in the service "a" column of the average processing time DB 128.

The CPU 11 extracts service "e" from the service processing time DB 127. The CPU 11 calculates an average processing time "92.50" that indicates the average of the service processing times "75.00", "223.33", and "60.00" of the tasks "T2-1", "T2-2", and "T2-3" corresponding to the extracted service "e". The CPU 11 stores the calculated average processing time "92.50" in the service "e" column of the average processing time DB 128. The CPU 11 performs the same processing on all the services of the service processing time DB 127.

Hereinafter, a method of calculating a bottleneck candidate will be described. The CPU 11 refers to the average processing time DB 128, and extracts the longest average processing time and a service corresponding to the longest average processing time among the average processing times of the services. Specifically, the CPU 11 extracts the average processing time "407.77 ms" and the service h. FIG. 15 is an explanatory diagram illustrating a display example in which an average processing time and a service are displayed. As illustrated in FIG. 15, the CPU 11 displays the extracted average processing time "407.77 ms" and the service h on the display unit 15, and completes the processing.

Figure 16:
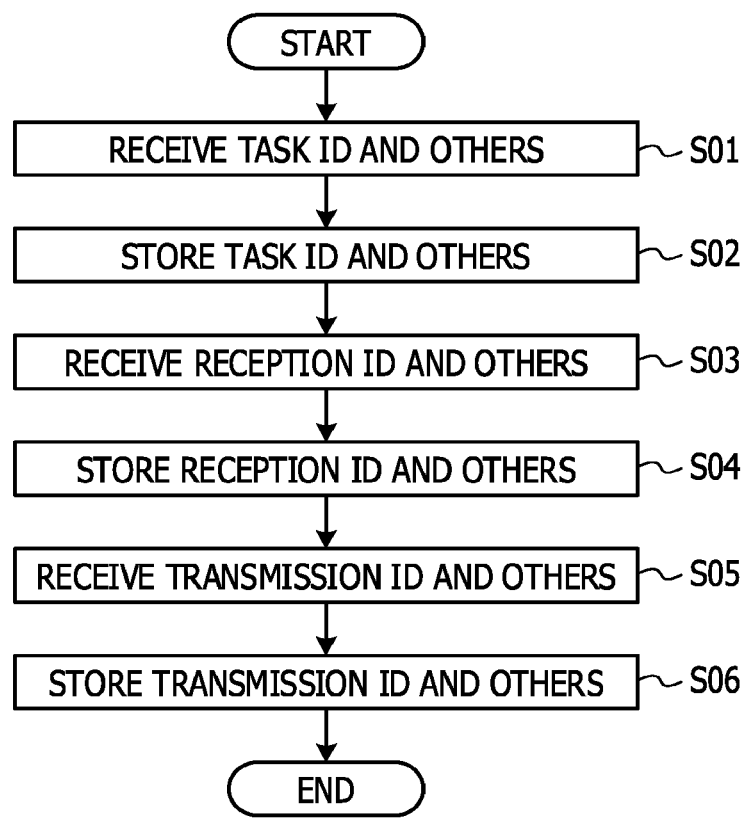
FIG. 16 is a flowchart illustrating the processing steps of a method of storing data in a gateway transmission-side time DB, a router transmission-side time DB and a router reception-side time DB in a first embodiment.
Figure 17:
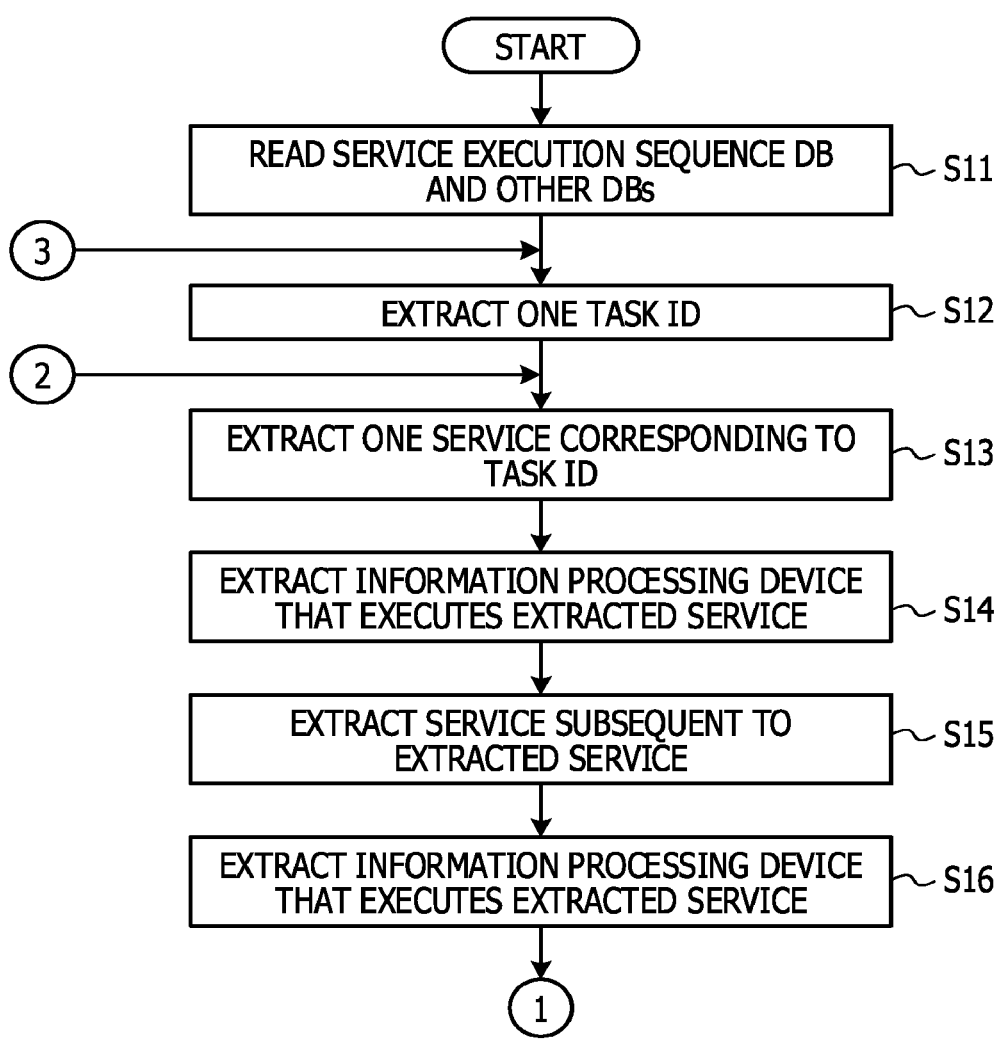
FIG. 17 is a flowchart illustrating processing steps of an information processing system in the first embodiment.
Figure 18:
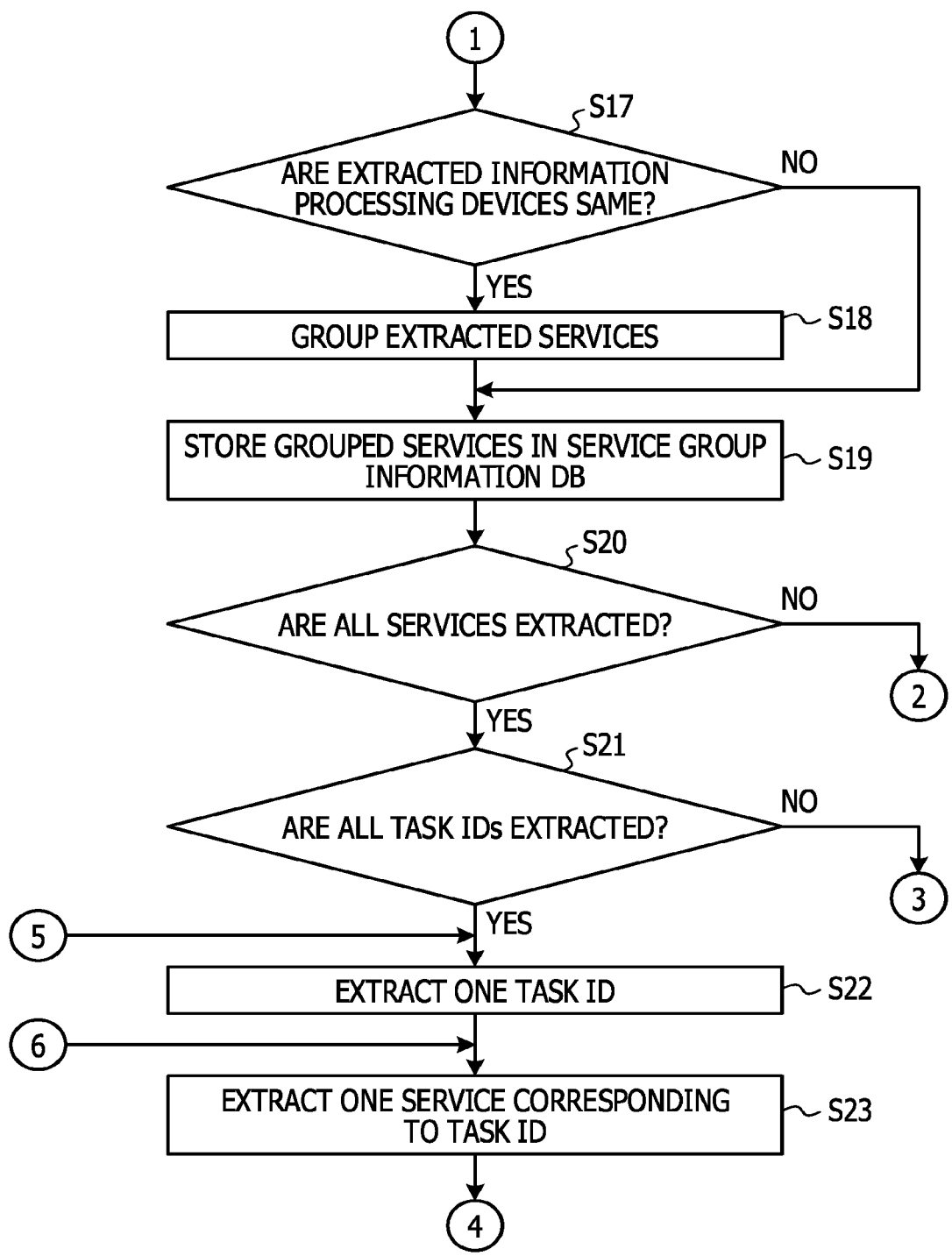
FIG. 18 is a flowchart illustrating processing steps in the information processing system in the first embodiment.
Figure 19:
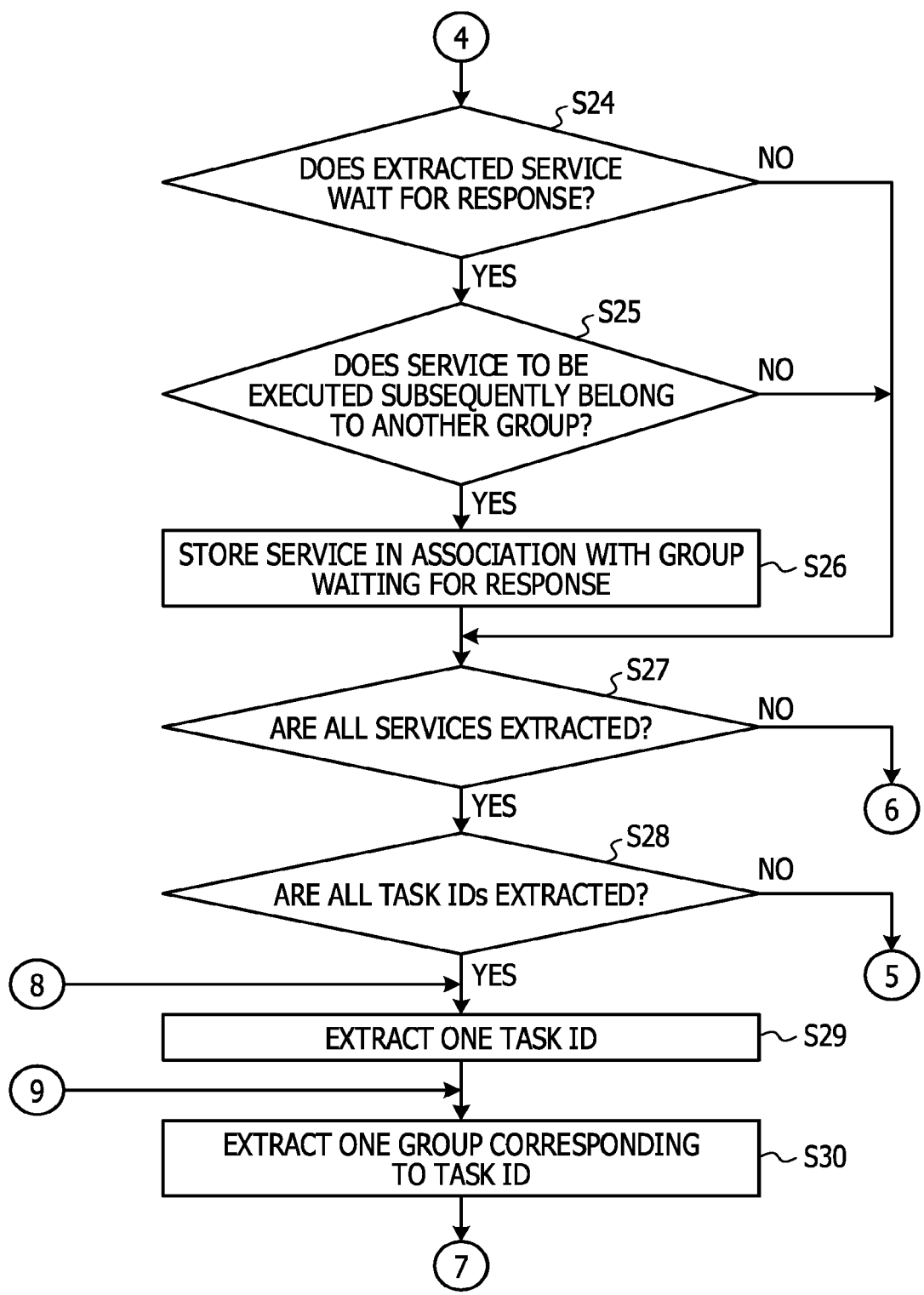
FIG. 19 is a flowchart illustrating processing steps in the information processing system in the first embodiment.
Figure 20:
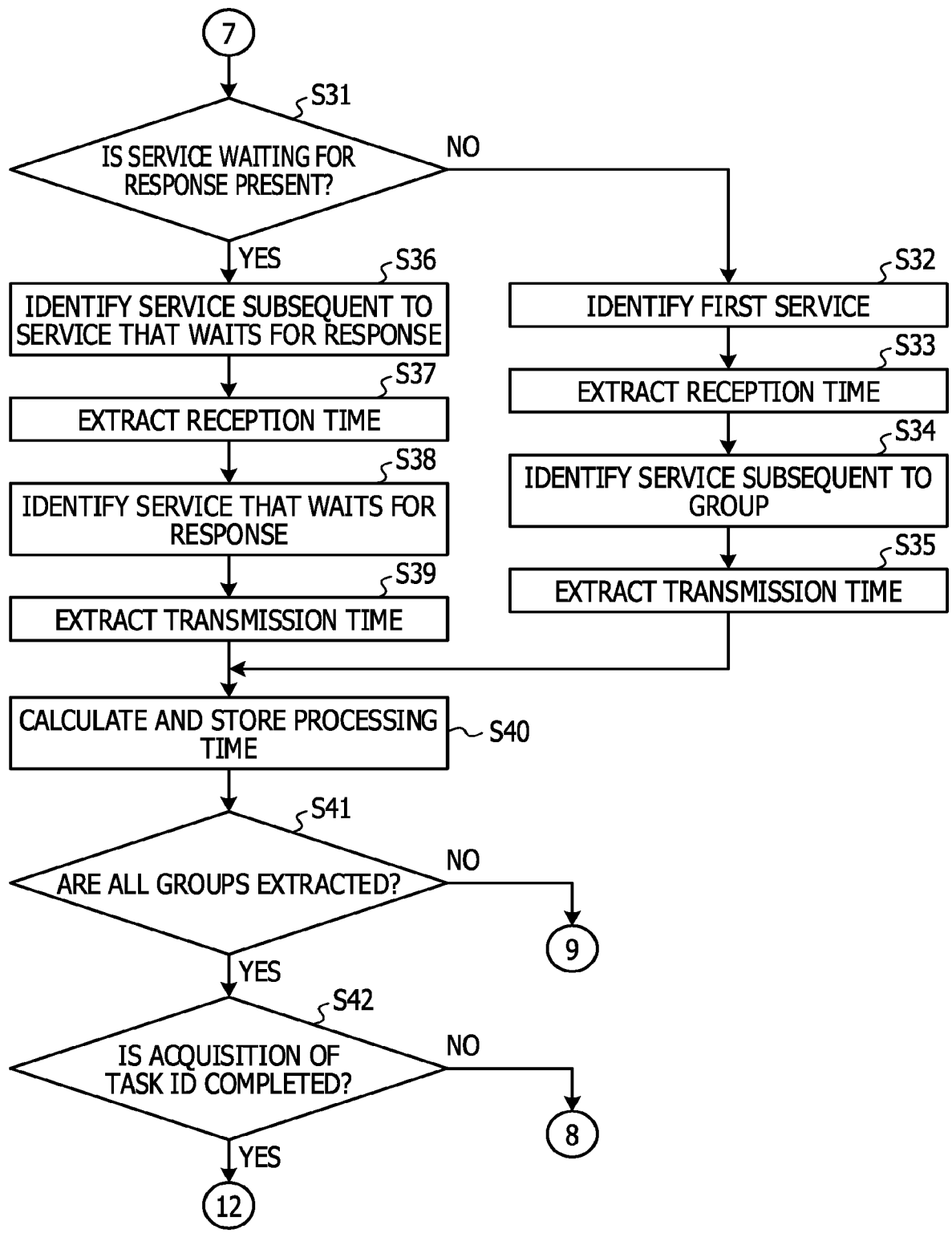
FIG. 20 is a flowchart illustrating processing steps in the information processing system in the first embodiment.
Figure 21:
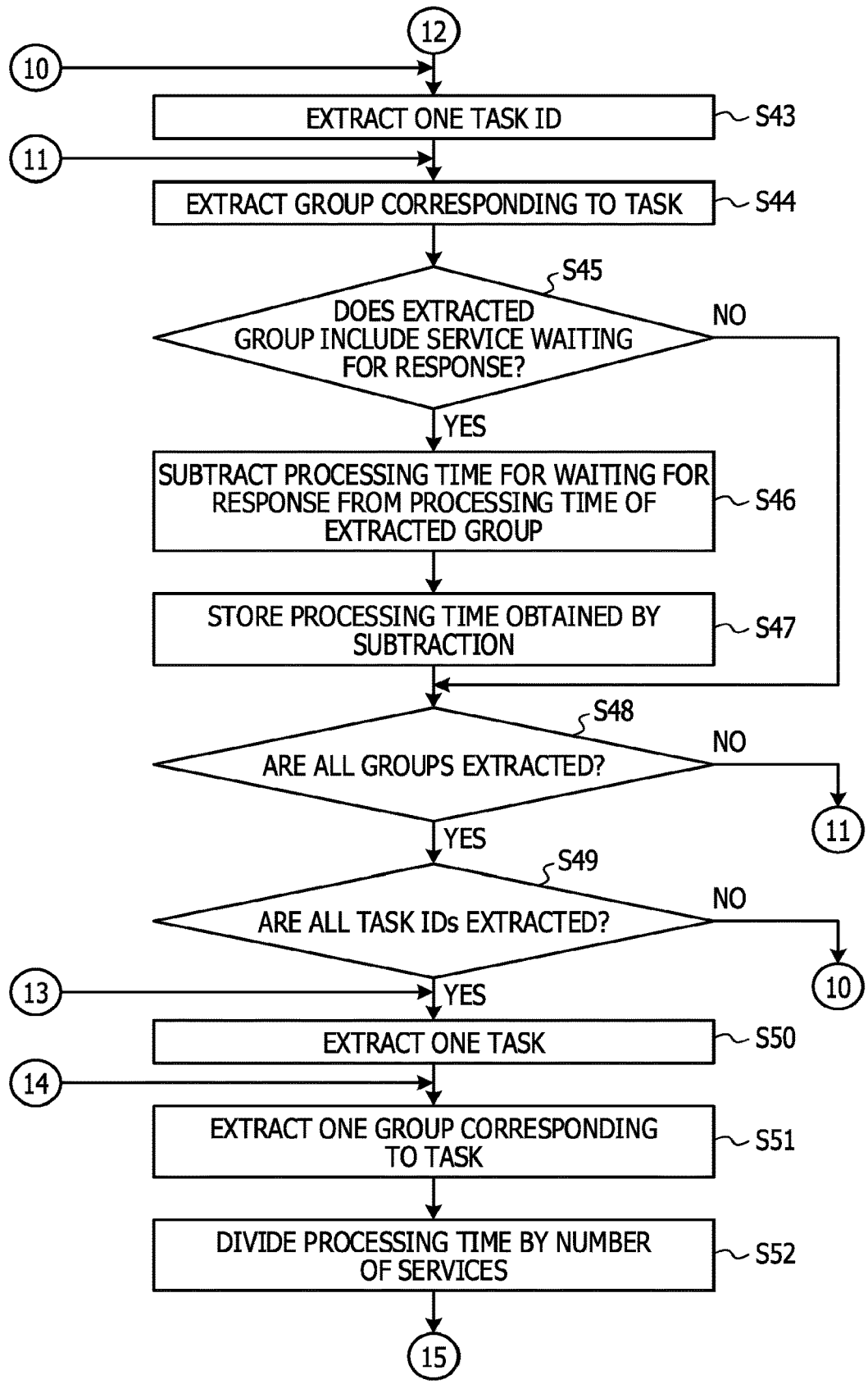
FIG. 21 is a flowchart illustrating processing steps in the information processing system in the first embodiment.
Figure 22:
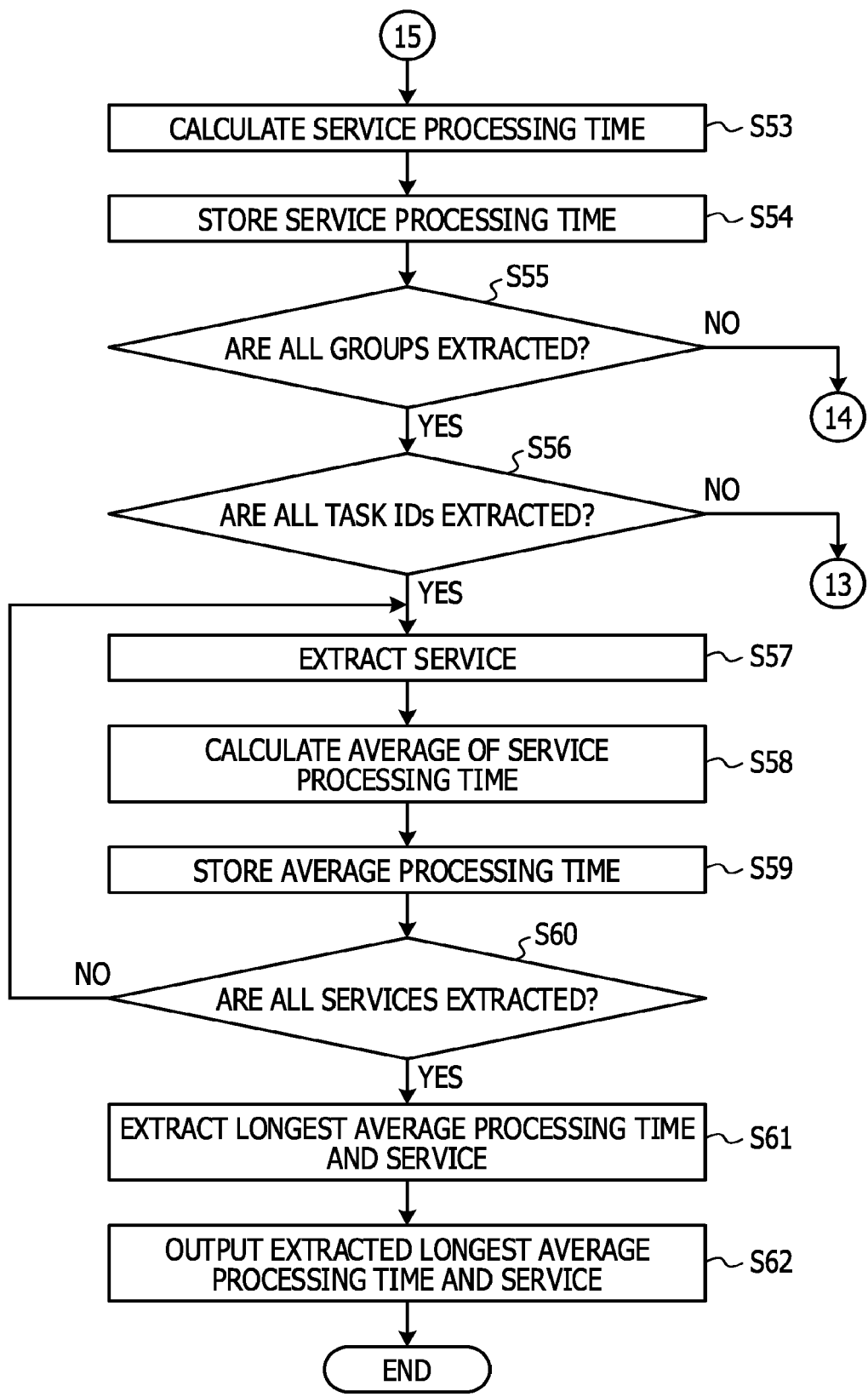
FIG. 22 is a flowchart illustrating processing steps in the information processing system in the first embodiment.

FIG. 16 is a flowchart illustrating the processing steps of a method of storing data in the gateway transmission-side time DB 122, the reception-side time DB 123 and the transmission-side time DB 124 in the first embodiment. The CPU 11 receives task ID, a transmission-destination information processing device, a service to be executed and a transmission time from the gateway 2 (step S01). The CPU 11 stores the received task ID, transmission-destination information processing device, service and transmission time in the gateway transmission-side time DB 122 (step S02).

The CPU 11 receives a reception ID, a transmission source information processing device, a service, response information and a reception time from the network equipment 3 (step S03). The CPU 11 stores the received reception ID, transmission source information processing device, service, response information and reception time in the reception-side time DB 123 (step S04).

The CPU 11 receives a transmission ID, a transmission destination information processing device, a service, response information and a transmission time from the network equipment 3 (step S05). The CPU 11 stores the received transmission ID, transmission destination information processing device, service, response information and transmission time in the transmission-side time DB 124 (step S06), and completes the processing.

FIGS. 17 to 22 are the flowcharts illustrating the processing steps in the information processing system in the first embodiment. The CPU 11 reads the service execution sequence DB 120, the task information DB 121, the gateway transmission-side time DB 122, the reception-side time DB 123, and the transmission-side time DB 124 from the memory unit 12 (step S11). The CPU 11 extracts a task ID from the task information DB 121 (step S12). The CPU 11 extracts a service corresponding to the extracted task ID, from the task information DB 121 (step S13).

The CPU 11 extracts the information processing device 4 that executes the extracted service, from the task information DB 121 (step S14). The CPU 11 refers to the service execution sequence DB 120, and extracts the service subsequent to the extracted service (step S15). The CPU 11 extracts the information processing device 4 that executes the extracted service, from the task information DB 121 (step S16). The CPU 11 determines whether or not the information processing devices 4 for the extracted service and the service executed subsequent to the extracted service are the same (step S17).

When the CPU 11 determines that the information processing devices 4 are not the same (NO in step S17), the flow proceeds to the processing in step S19. When the CPU 11 determines that the information processing devices 4 are the same (YES in step S17), the extracted two services are grouped (step S18). The grouped services are stored in the service group information DB 125 (step S19). The CPU 11 determines whether or not all the services corresponding to the task ID in the task information DB 121 are extracted (step S20).

When the CPU 11 determines that not all the services are extracted (NO in step S20), the flow proceeds to the processing in step S13, and the processing is repeated. When the CPU 11 determines that all the services are extracted (YES in step S20), the CPU 11 determines whether or not all the task IDs are extracted (step S21). When the CPU 11 determines that not all the task IDs are extracted (NO in step S21), the flow proceeds to the processing in step S12, and the processing is repeated. When the CPU 11 determines that all the task IDs are extracted (YES in step S21), the CPU 11 extracts a task ID from the task information DB 121 (step S22).

The CPU 11 extracts a service corresponding to the extracted task ID, from the task information DB 121 (step S23). The CPU 11 refers to the reception-side time DB 123 or the transmission-side time DB 124, and determines whether or not the extracted service waits for a response (step S24). When the CPU 11 determines that the extracted service does not wait for a response (NO in step S24), the flow proceeds to the processing in step S27.

When the CPU 11 determines that the extracted service waits for a response (YES in step S24), the CPU 11 refers to the service group information DB 125 and determines whether or not the service executed subsequent to the extracted service belongs to another group (step S25). When the CPU 11 determines that the service executed subsequent to the extracted service does not belong to another group (NO in step S25), the flow proceeds to the processing in step S27.

When the CPU 11 determines that the service executed subsequent to the extracted service belongs to another group (YES in step S25), stores the service in the service group information DB 125 in association with a group waiting for a response (step S26). The CPU 11 determines whether or not all the services corresponding to the task ID in the task information DB 121 are extracted (step S27).

When the CPU 11 determines that not all the services are extracted (NO in step S27), the flow proceeds to the processing in step S23, and the processing is repeated. When the CPU 11 determines that all the services are extracted (YES in step S27), the CPU 11 determines whether or not all the task IDs are extracted (step S28). When the CPU 11 determines that not all the task IDs are extracted (NO in step S28), the flow proceeds to the processing in step S22, and the processing is repeated. When the CPU 11 determines that all the task IDs are extracted (YES in step S28), the subsequent processing is performed. The CPU 11 extracts a task ID from the service group information DB 125 (step S29). The CPU 11 extracts a group corresponding to the extracted task ID, from the service group information DB 125 (step S30).

The CPU 11 determines whether or not waiting for a response is present in the extracted group (step S31). When the CPU 11 determines that waiting for a response is not present in the extracted group (NO in step S31), the CPU 11 identifies the first service in the group in the service group information DB 125 (step S32). The CPU 11 refers to the reception-side time DB 123, and extracts the reception time of the identified service (step S33). The CPU 11 identifies the service subsequent to the group including waiting for a response in the service group information DB 125 (step S34). The CPU 11 refers to the transmission-side time DB 124, and extracts the transmission time of the identified service (step S35).

When the CPU 11 determines that waiting for a response is present in the extracted group (YES in step S31), the CPU 11 identifies the service subsequent to the service that waits for a response in the service group information DB 125 (step S36). Specifically, the CPU 11 identifies an instruction command to execute the subsequent service in the group. The CPU 11 refers to the reception-side time DB 123, and extracts the reception time of the identified service (step S37). The CPU 11 identifies the service that waits for a response in the service group information DB 125 (step S38). Specifically, the CPU 11 identifies the service at the transmission destination of a response command in the service group information DB 125. The CPU 11 refers to the transmission-side time DB 124, and extracts the time of transmission to the identified service (step S39). The CPU 11 calculates the processing time per group by subtracting the transmission time from the reception time, and stores the calculated processing time in the processing time DB 126 (step S40).

The CPU 11 determines whether or not all the groups are extracted (step S41). When the CPU 11 determines that not all the groups are extracted (NO in step S41), the flow proceeds to the processing in step S30, and the processing is repeated. When the CPU 11 determines that all the groups are extracted (YES in step S41), the CPU 11 determines whether or not all the task IDs are extracted (step S42). When the CPU 11 determines that not all the task IDs are extracted (NO in step S42), the flow proceeds to the processing in step S29, and the processing is repeated. When the CPU 11 determines that all the task IDs are extracted (YES in step S42), the CPU 11 extracts a task ID from the service group information DB 125 (step S43). The CPU 11 extracts a group corresponding to the extracted task ID, from the service group information DB 125 (step S44).

The CPU 11 refers to the service group information DB 125, and determines whether or not the extracted group includes a service that waits for a response (step S45). When the CPU 11 determines that the extracted group does not include a service that waits for a response (NO in step S45), the flow proceeds to the processing in step S48. When the CPU 11 determines that the extracted group includes a service that waits for a response (YES in step S45), the CPU 11 subtracts the processing time for waiting for a response from the processing time of the extracted group (step S46).

The CPU 11 stores the processing time obtained by the subtraction in the processing time DB 126 (step S47). The CPU 11 determines whether or not all the groups corresponding to the task ID in the service group information DB 125 are extracted (step S48). When the CPU 11 determines that not all the groups are extracted (NO in step S48), the flow proceeds to the processing in step S44, and the processing is repeated. When the CPU 11 determines that all the groups are extracted (YES in step S48), the CPU 11 determines whether or not all the task IDs are extracted (step S49). When the CPU 11 determines that not all the task IDs are extracted (NO in step S49), the flow proceeds to the processing in step S43, and the processing is repeated. When the CPU 11 determines that all the task IDs are extracted (YES in step S49), the CPU 11 extracts a task ID from the processing time DB 126 (step S50). The CPU 11 extracts a group corresponding to the extracted task ID, from the processing time DB 126 (step S51).

The CPU 11 refers to the service group information DB 125 and the processing time DB 126, and divides the processing time of the group by the number of the services included in the group (step S52). The CPU 11 calculates a service processing time by assigning the divided processing time to each of the services (step S53). The CPU 11 stores the calculated service processing time in the service processing time DB 127 (step S54).

The CPU 11 determines whether or not all the groups corresponding to the task ID in the service group information DB 125 are extracted (step S55). When the CPU 11 determines that not all the groups are extracted (NO in step S55), the flow proceeds to the processing in step S51, and the processing is repeated. When the CPU 11 determines that all the groups are extracted (YES in step S55), the CPU 11 determines whether or not all the task IDs are extracted (step S56). When the CPU 11 determines that not all the task IDs are extracted (NO in step S56), the flow proceeds to the processing in step S50, and the processing is repeated. When the CPU 11 determines that all the task IDs are extracted (YES in step S56), the CPU 11 extracts one service from the service processing time DB 127 (step S57).

The CPU 11 calculates an average processing time that indicates an average of the service processing times of a task(s) corresponding to the extracted service (step S58). The CPU 11 stores the calculated average processing time in the average processing time DB 128 (step S59). The CPU 11 determines whether or not all the services in the service processing time DB 127 are extracted (step S60).

When the CPU 11 determines that not all the services in the service processing time DB 127 are extracted (NO in step S60), the flow proceeds to the processing in step S57, and the processing is repeated. When the CPU 11 determines that all the services in the service processing time DB 127 are extracted (YES in step S60), the CPU 11 extracts the longest average processing time and the service with the longest average processing time among the average processing times (step S61). The CPU 11 outputs the extracted average processing time and service as a bottleneck candidate to the display unit 15 (step S62), and completes the processing.

According to an aspect, it is possible to easily identify a bottleneck candidate which may act as an obstacle to execution of services.

According to an aspect, it is possible to calculate a service processing time more accurately by subtracting the processing time of a service that waits for a response from a relevant processing time.

According to an aspect, it is possible to calculate a service processing time more quickly than in the related art by subtracting a transmission time from a reception time.

According to an aspect, the processing time is calculated for relevant information processing devices 4 in a group, thereby making it possible to calculate the service processing time more easily than in the related art in which the processing time is calculated for each information processing device 4.

According to an aspect, it is possible to easily identify a bottleneck candidate by extracting the longest average processing time among the calculated average processing times.

Although the CPU 11 in the first embodiment calculates average processing times and extracts the longest average processing time among the calculated average processing times, the first embodiment is not limited to this. For instance, the CPU 11 may calculate the total time of the service processing time per service, and may extract the longest total time among the calculated total values.

Although information such as service, transmission time and reception time is received from the network equipment 3 in the first embodiment, the information may be received from the information processing device 4. Although the transmission time of the gateway 2 is used in the first embodiment, information such as the transmission time and the reception time of the information processing device 1 may be used.

Second Embodiment

A second embodiment relates to an embodiment that extracts an average processing time greater than or equal to a predetermined threshold. The configuration and operation other than particularly described in the following are the same as in the first embodiment, and thus a description is omitted for the sake of simplicity. The second embodiment will be described with reference to FIG. 14. The CPU 11 extracts an average processing time greater than or equal to a predetermined threshold and a service corresponding to the average processing time. The predetermined threshold is, for instance, a value inputted via the input unit 14 at will by an administrator of the information processing device 1, and is set to 100 ms in the second embodiment. The CPU 11 extracts "120.00 ms", "134.44 ms", and "407.77 ms". The CPU 11 extracts the services g, h and i. The CPU 11 outputs "120.00 ms", "134.44 ms" and "407.77 ms" and the services g, h and i to the display unit 15.

Figure 23:
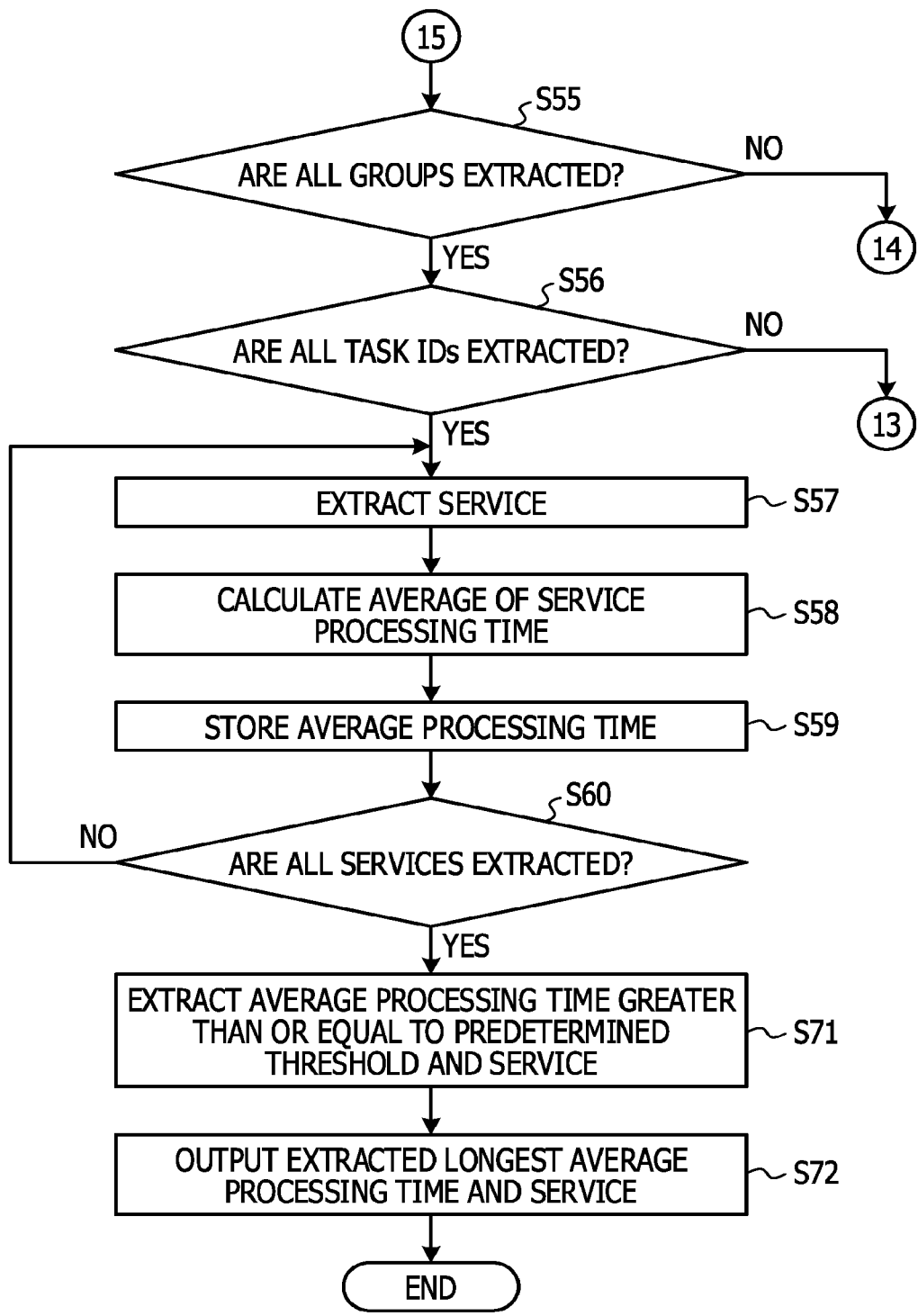
FIG. 23 is a flowchart illustrating processing steps in the information processing system in a second embodiment.

FIG. 23 is a flowchart illustrating processing steps in the information processing system in the second embodiment. The processing in steps S11 to S62 is the same as the processing in the information processing system according to the first embodiment, and thus a description is omitted for the sake of simplicity. When the result is YES in step S60, the CPU 11 extracts an average processing time greater than or equal to a predetermined threshold and a service corresponding to the average processing time (step S71). The CPU 11 outputs the extracted average processing time and service to the display unit 15 (step S62), and completes the processing.

According to an aspect, it is possible to cope with the case where multiple bottleneck candidates are present by extracting an average processing time greater than or equal to a predetermined threshold.

Although an average processing time greater than or equal to a predetermined threshold is extracted in the second embodiment, a service processing time greater than or equal to a predetermined threshold may be extracted.

Third Embodiment

Figure 24:
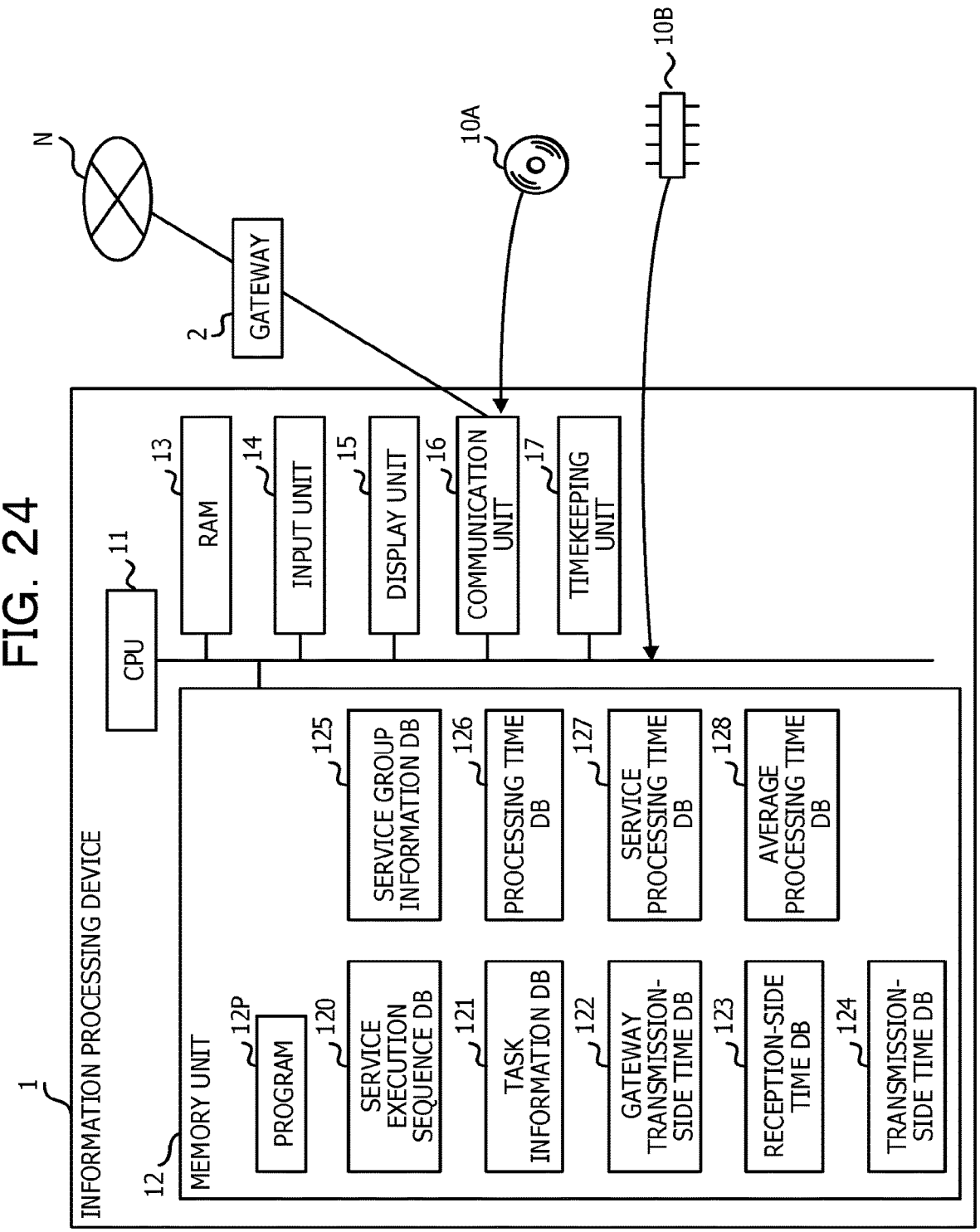
FIG. 24 is a block diagram illustrating a hardware group of an information processing device in a third embodiment.

Hereinafter a third embodiment in the present disclosure will be described in detail based on the drawings that illustrate the third embodiment. FIG. 24 is a block diagram illustrating the hardware group of the information processing device 1. The configuration and operation other than particularly described in the following are the same as in the first embodiment, and thus a description is omitted for the sake of simplicity. The information processing device 1 illustrated in FIG. 24 reads a program that executes the above-described various software processes from a field-portable recording medium 10A or a semiconductor memory 10B, or downloads the program from other server (not illustrated) via the communication network N. The program is installed as the program 12P, and is loaded to the memory unit 12 and is executed. In this manner, the information processing device 1 functions as described above.

A program for operating the information processing device 1 may allow a reading unit 111 such as a disk drive to read data in the field-portable recording medium 10A such as a CD-ROM, a digital versatile disc (DVD), a memory card or a universal serial bus (USB) memory, and may store the read data in the memory unit 12. Alternatively, the semiconductor memory 10B such as a flash memory which stores the program may be mounted on the information processing device 1. The communication unit 16 is, for instance, a wireless LAN card or a communication module for mobile phones, and is coupled to other server via the communication network N. The program may be downloaded from other server (not illustrated) which is coupled by the communication unit 16 via the communication network N such as the Internet. The details will be described in the following.

Figure 25:
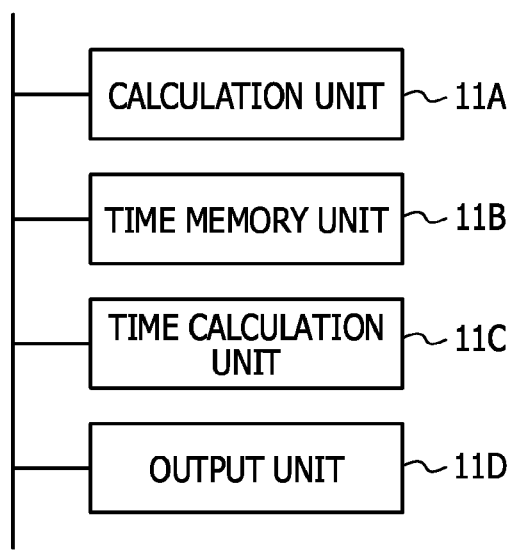
FIG. 25 is a functional block diagram of an information processing device.

FIG. 25 is a functional block diagram of the information processing device 1. The CPU 11 executes the program 12P, thereby causing the information processing device 1 to operate as follows. A calculation unit 11A calculates a processing time of each of groups for each of multiple tasks each including multiple services, the groups being a group of services continuously executed by the same information processing device, based on communication times related to processing of the services in each of the tasks and on information on information processing devices that execute the services. A time memory unit 11B stores a service processing time for each task, the service processing time being obtained by dividing the processing time of each group calculated by the calculation unit 11A by the number of the services included in the group. A time calculation unit 11C calculates an average processing time by averaging the service processing times for each task. An output unit 11D outputs a service as a bottleneck candidate based on the average processing time calculated by the time calculation unit 11C.

It is to be understood that the embodiments disclosed herein are for illustrative purposes in every sense and not for limiting purposes. It is contemplated that the scope of the present disclosure is defined by the CLAIMS rather than the above description, and includes all modifications within the meaning and the range of equivalency of the CLAIMS. In addition, the embodiments may be combined as appropriate in a range without causing inconsistency between the details of processing.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A method, comprising:
    transmitting, by one or more information processing devices, communication time information related to processes of a plurality of services included in each of a plurality of tasks and information on the one or more information processing devices that executed the plurality of services, the communication time information including a transmission time of an execution command for each of the plurality of services and a response time corresponding to the transmission time;
    receiving, by a computer, the communication time information and the information on the one or more information processing devices;
    calculating, for each of the plurality of tasks, a processing time for each of a plurality of groups obtained by grouping services continuously executed in a same information processing devices of the one or more information processing devices based on the received communication time information and the received information on the one or more information processing devices;

calculating, for each of the plurality of tasks, a service processing time for each of the plurality of groups by dividing the calculated processing time for a group by a number of services included in the group, wherein the service processing time is calculated more accurately by subtracting a processing time of a service that waits for a response from a relevant processing time and wherein the service processing time is calculated more quickly by subtracting a transmission time from a reception time;

calculating, for each of the plurality of tasks, an average processing time by averaging the processing times and the service processing times;

extracting a service corresponding to an average processing time among the calculated average processing times from the plurality of services that is greater than or equal to a predetermined threshold; and outputting, at a display, the extracted service as a bottleneck candidate when the average processing time is greater than or equal to the predetermined threshold.

2. The method according to claim 1, further comprising:

after the calculating of a first processing time, determining whether or not a service that waits for a response from another service is present in each of the groups based on response information that indicates a state where each of the plurality of services waits for a response from another service; and when it is determined that the service that waits for a response is present, subtracting a processing time of a group including a service that transmits the response from a processing time of a group including the service that waits for the response.

3. The method according to claim 1, further comprising:

determining whether or not a service that waits for a response from another service is present based on response information that indicates a state where each of the plurality of services waits for a response;

when it is determined that the service that waits for the response is not present, receiving, from a relay device coupled to each of the one or more information processing devices, a reception time at the relay device in receiving a specific execution command to execute a first service in the group, and a transmission time at the relay device in transmitting another instruction command to execute a service to be executed subsequent to the group; and calculating a first processing time per group by subtracting the reception time from the transmission time.

4. The method according to claim 1, further comprising:

determining whether or not a service that waits for a response from another service is present based on response information that indicates a state where each of the services waits for a response;

when it is determined that the service that waits for the response is present, receiving, from a relay device coupled to each of the one or more information processing devices, a reception time at the relay device in receiving a specific execution command to execute the services in the group including the service that waits for the response, and a transmission time at the relay device in transmitting a response command indicating a response to the execution command; and calculating a first processing time per group by subtracting the reception time from the transmission time.

5. The method according to claim 1, further comprising:

displaying the bottleneck candidate and the average processing time of the bottleneck candidate based on the average processing times.

6. The method according to claim 1, further comprising:

outputting, as the bottleneck candidate, a service with the longest average processing time among the average processing times for the task.

7. A method executed by a computer, the method comprising:

based on communication times related to processing of a plurality of services included in each of a plurality of tasks and on information on an information processing device that executes each of the plurality of services, calculating a processing time per group for each of the tasks, the group being a group of one or more services continuously executed by a same information processing device;

storing a service processing time for each task, the service processing time obtained by dividing the calculated processing time per group by a number of the services included in the group, wherein the service processing time is calculated more accurately by subtracting a processing time of a service that waits for a response from a relevant processing time and wherein the service processing time is calculated more quickly by subtracting a transmission time from a reception time;

calculating an average processing time by averaging the service processing times for each of the tasks;

extracting a service corresponding to an average processing time among the calculated average processing times from the plurality of services that is greater than or equal to a predetermined threshold; and outputting, at a display, the extracted service as a bottleneck candidate when the average processing time is greater than or equal to the predetermined threshold.

8. A device comprising:

a memory; and a processor coupled to the memory and configured to:

transmit communication time information related to processes of a plurality of services included in each of a plurality of tasks and information on one or more information processing devices that executed the plurality of services, the communication time information including a transmission time of an execution command for each of the plurality of services and a response time corresponding to the transmission time, receive the communication time information and the information on the one or more information processing devices, calculate, for each of the plurality of tasks, a processing time for each of a plurality of groups obtained by grouping services continuously executed in a same information processing devices of the one or more information processing devices based on the received communication time information and the received information on the one or more information processing devices, calculate, for each of the plurality of tasks, a service processing time for each of the plurality of groups by dividing the calculated processing time for a group by a number of services included in the group, wherein the service processing time is calculated more accurately by subtracting a processing time of a service that waits for a response from a relevant processing time and wherein the service processing time is calculated more quickly by subtracting a transmission time from a reception time, calculate, for each of the plurality of tasks, an average processing time by averaging the processing times and the service processing times, extract a service corresponding to an average processing time among the calculated average processing times from the plurality of services that is greater than or equal to a predetermined threshold, and output, at a display, the extracted service as a bottleneck candidate when the average processing time is greater than or equal to the predetermined threshold.

9. The device according to claim 8, wherein the processor is configured to:

after a calculation of a first processing time, determine whether or not a service that waits for a response from another service is present in each of the groups based on response information that indicates a state where each of the plurality of services waits for a response from another service, and when it is determined that the service that waits for a response is present, subtract a processing time of a group including a service that transmits the response from a processing time of a group including the service that waits for the response.

10. The device according to claim 8, wherein the processor is configured to:

determine whether or not a service that waits for a response from another service is present based on response information that indicates a state where each of the plurality of services waits for a response, when it is determined that the service that waits for the response is not present, receive, from a relay device coupled to each of the one or more information processing devices, a reception time at the relay device in receiving a specific execution command to execute a first service in the group, and a transmission time at the relay device in transmitting another instruction command to execute a service to be executed subsequent to the group, and calculate a first processing time per group by subtracting the reception time from the transmission time.

11. The device according to claim 8, wherein the processor is configured to:

determine whether or not a service that waits for a response from another service is present based on response information that indicates a state where each of the services waits for a response, when it is determined that the service that waits for the response is present, receive, from a relay device coupled to each of the one or more information processing devices, a reception time at the relay device in receiving a specific execution command to execute the services in the group including the service that waits for the response, and a transmission time at the relay device in transmitting a response command indicating a response to the execution command, and calculate a first processing time per group by subtracting the reception time from the transmission time.

12. The device according to claim 8, wherein the processor is configured to display the bottleneck candidate and the average processing time of the bottleneck candidate based on the average processing times.

13. The device according to claim 8, wherein the processor is configured to output, as the bottleneck candidate, a service with the longest average processing time among the average processing times for the task.

* * * * *